US009196444B2

(12) United States Patent
Wan

(10) Patent No.: US 9,196,444 B2
(45) Date of Patent: Nov. 24, 2015

(54) CIRCUIT BREAKER

(75) Inventor: Jiasheng Wan, Wuhan (CN)

(73) Assignees: HUBEI SHENGJIA WIRING CO., LTD., Wuhan (CN); Jiasheng Wan, Wuhan (CN)

( * ) Notice: Subject to any disclaimer, the term of this patent is extended or adjusted under 35 U.S.C. 154(b) by 908 days.

(21) Appl. No.: 13/433,273

(22) Filed: Mar. 28, 2012

(65) Prior Publication Data

US 2012/0181157 A1 Jul. 19, 2012

Related U.S. Application Data

(63) Continuation-in-part of application No. PCT/CN2010/000830, filed on Jun. 11, 2010.

(51) Int. Cl.

*H02H 3/00* (2006.01)
*H01H 71/70* (2006.01)
*H01H 71/52* (2006.01)
*H01H 3/00* (2006.01)
*H01H 33/02* (2006.01)
*H01H 33/42* (2006.01)
*H01H 83/00* (2006.01)

(52) U.S. Cl.

CPC ............... *H01H 71/70* (2013.01); *H01H 71/52* (2013.01); *H01H 3/00* (2013.01); *H01H 33/022* (2013.01); *H01H 33/42* (2013.01); *H01H 83/00* (2013.01)

(58) Field of Classification Search

USPC ........................................................ 361/42–50
See application file for complete search history.

(56) References Cited

U.S. PATENT DOCUMENTS

| | | | | |
|---|---|---|---|---|
| 8,134,092 | B2 * | 3/2012 | Turner et al. | 200/293 |
| 2007/0063808 | A1 * | 3/2007 | Darr et al. | 337/143 |
| 2009/0206059 | A1 * | 8/2009 | Kiko | 218/143 |

* cited by examiner

*Primary Examiner* — Danny Nguyen
(74) *Attorney, Agent, or Firm* — Matthias Scholl, PC; Matthias Scholl

(57) ABSTRACT

A built-in intelligent circuit breaker with an automatic closing function, including a box body and a bearing plate. Inside the box body is provided a circuit breaker actuating mechanism, a wire inlet end, and a wire outlet end. The circuit breaker actuating mechanism is triggered by a poke rod positioned in the box body. The bearing plate is positioned in the box body and combined with an electrical operating mechanism. The electrical operating mechanism is provided with an execution end, and the execution end is connected with the poke rod, such that the circuit breaker actuating mechanism is triggered by the poke rod to realize the on/off of the circuit breaker during the operation of the electrical operating mechanism under the control of an automatic closing control unit.

25 Claims, 36 Drawing Sheets

CIRCUIT BREAKER

CROSS-REFERENCE TO RELATED APPLICATIONS

This application is a continuation-in-part of International Patent Application No. PCT/CN2010/000830 with an international filing date of Jun. 11, 2010, designating the United States, now pending, and further claims priority benefits to Chinese Patent Application No. 200910204107.7 filed Sep. 29, 2009, and to Chinese Patent Application No. 200910179588.0 filed Sep. 29, 2009. The contents of all of the aforementioned applications, including any intervening amendments thereto, are incorporated herein by reference.

BACKGROUND OF THE INVENTION

1. Field of the Invention

The invention relates to a circuit breaker, and more particularly to a built-in intelligent circuit breaker capable of realizing automatic closing function, and a miniature intelligent circuit breaker with automatic closing function.

2. Description of the Related Art

As to the electric power department, a circuit breaker is an essential device for ensuring the electricity safety and circuit switching.

As shown in FIG. 1A, an example of a circuit breaker in the prior art, which is called a circuit breaker body in the invention. The circuit breaker can be a three-phase or a single-phase circuit breaker, and can also be an ordinary miniature circuit breaker or a big switch. Each circuit breaker includes a box body; the box body includes an upper cover and a bottom box, wherein a notch groove is formed on the upper cover, and two ends of the notch groove are positioned in the on/off position correspondingly to the circuit breaker; a poke rod extends out of the notch groove; a circuit breaker actuating mechanism, a wire inlet end and a wire outlet end are arranged on the bottom box, and the circuit breaker actuating mechanism is triggered through the poke rod; the circuit breaker actuating mechanism further includes a linkage component connected with the poke rod, a movable contact arm is hinged at the lower end of a linkage rod of the linkage component, when the linkage component rotates under the action of the poke rod, the movable contact arm is driven to rotate, a moving contact on the movable contact arm is in contact with a stationary contact on a static contact piece, and the static contact piece is connected with the wire outlet end on the bottom box, so that the purpose of transmitting current out is achieved.

As shown in FIG. 1B and FIG. 1C, examples of a circuit breaker in the prior art, which are ordinary miniature circuit breakers. Each circuit breaker includes a box body; the common box body includes an upper cover and a bottom box, wherein a notch groove 1111 is formed on the upper cover, and two ends of the notch groove 1111 are positioned in the on/off position correspondingly to the circuit breaker; a handle 114 extends out of the notch groove; a circuit breaker actuating mechanism, a wire inlet end and a wire outlet end are arranged on the bottom box, and the circuit breaker actuating mechanism is triggered through the handle; the circuit breaker actuating mechanism further includes a linkage rod connected with the handle, a movable contact arm is hinged at the lower end of the linkage rod, a spring is arranged at the small end of the linkage rod, when the linkage rod rotates under the action of the handle, the movable contact arm is driven to rotate, a moving contact on the movable contact arm is in contact with a stationary contact on a static contact piece, and the static contact piece is connected with the wire outlet end on the bottom box, so that the purpose of transmitting current out is achieved; the movable contact arm is connected with a leading-in metal sheet through a metal connecting rod; an arc-extinguishing device is arranged at the lower part of the contact area between the moving contact and the stationary contact; meanwhile, a transverse partition board is arranged on the bottom box.

However, the conventional circuit breaker still has the following defects:

1. In a prepayment system, the circuit breaker cannot be automatically closed after the electricity bills are paid by electricity consumers, and the electricity consumers have to deal with it by themselves, thus inconvenience is brought to the electricity consumers;
2. When the temperature is too high, and the use of electricity is abnormal, the opening speed of the conventional circuit breaker is slower;
3. The circuit breaker can be closed by users under the condition without eliminating the condition of abnormal use of electricity, thus potential safety hazards may be caused.

SUMMARY OF THE INVENTION

In view of the above-described problems, it is one objective of the invention to provide a built-in intelligent circuit breaker with automatic closing function.

To achieve the above objective, in accordance with one embodiment of the invention, there is provided a built-in intelligent circuit breaker with automatic closing function, comprising: a circuit breaker body, the circuit breaker body comprising an upper cover and a bottom box, wherein a notch groove is formed on the upper cover, and two ends of the notch groove are positioned in the on/off position correspondingly to the circuit breaker; a poke rod extends out of the notch groove; a circuit breaker actuating mechanism, a wire inlet end, and a wire outlet end are arranged on the bottom box, and the circuit breaker actuating mechanism is triggered through the poke rod; a bearing plate is arranged between the upper cover and the bottom box and combined with an electrical operating mechanism, the electrical operating mechanism is provided with an execution end connected with the poke rod, and the poke rod is switched in the on/off state during the operation of the electrical operating mechanism under the control of an automatic closing control unit.

In a class of this embodiment, the electrical operating mechanism comprises a pinion-and-rack mechanism and a shifting part; the shifting part is connected with the poke rod; a motor is arranged in a bottom box, and the pinion-and-rack mechanism transforms the rotation of the motor into reciprocating action of the shifting part, so that the circuit breaker actuating mechanism is triggered by the poke rod to realize the on/off of the circuit breaker.

In a class of this embodiment, the electrical operating mechanism comprises: a translational mechanism and a shifting part; the shifting part is connected with the poke rod; the translational mechanism drives the shifting part to make reciprocating motion, so that the circuit breaker actuating mechanism is triggered by the poke rod to realize the on/off of the circuit breaker.

In a class of this embodiment, the electrical operating mechanism comprises a crank part and a shifting part, and the shifting part is connected with the poke rod; a motor is arranged in the bottom box, and the rotation of the motor is transformed into reciprocating action of the shifting part through the crank part under the control of the automatic closing control unit, so that the poke rod is switched in the on/off state.

In accordance with another embodiment of the invention, there provided is a miniature intelligent circuit breaker with automatic closing function, comprising: a circuit breaker body; the circuit breaker body comprising a box body, wherein the box body comprises an upper cover and a bottom box, and a circuit breaker actuating mechanism for switching on/off the circuit breaker, a wire inlet end, and a wire outlet end are arranged in the box body; an automatic closing function part is arranged inside the box body and comprises an automatic closing mechanical unit and an automatic closing control unit, and the automatic closing mechanical unit comprises a motor and an intermediate transmission mechanism; the operation of the motor is realized through the automatic closing control unit, the circuit breaker actuating mechanism is further driven to move through the transmission of the intermediate transmission mechanism, and the closing action of the circuit breaker is ultimately realized.

In a class of this embodiment, the circuit breaker actuating mechanism comprises: a poke rod, a linkage rod, and a movable contact arm; the poke rod extends out of the box body through the notch groove on the box body (similar to a handle) or arranged in the closed box body (the poke rod is not exposed out of the box body); the linkage rod is connected with the poke rod and driven to rotate by shifting the poke rod; a moving contact is arranged on the movable contact arm, and is in contact with or separated from a stationary contact through the rotation of the linkage rod.

In a class of this embodiment, the intermediate transmission mechanism can be designed with different structures as follows. For example, the intermediate transmission mechanism adopts a speed reducer and a shift lever, and an output shaft of the speed reducer is connected with the shift lever.

In a class of this embodiment, the intermediate transmission mechanism comprises: a driving gear disc obtaining the torque of the motor and a driven gear disc; unidirectional teeth are arranged on the working surface of the driving gear disc; unidirectional teeth corresponding to those of the driving gear disc are arranged on the working surface of the driven gear disc, and an output shaft of the driven gear disc drives the poke rod to turn.

In a class of this embodiment, the intermediate transmission mechanism comprises: a driving rotating disc and a driven rotating disc; the driving rotating disc obtains the torque of the motor; an arc-shaped chute is formed on the driving rotating disc and coaxial with the driving rotating disc; a connecting groove is formed on the driven rotating disc, and an output shaft of the driven rotating disc drives the poke rod to turn.

To make the box body have a compact mechanical structure, the intermediate transmission mechanism further comprises: a supporting frame used for allowing an intermediate transmission piece to be arranged in.

In a class of this embodiment, the supporting frame comprises two opposite supporting plates, and the poke rod turns in the space between the supporting plates.

In a class of this embodiment, separate lugs distributed at an angle of 120 degrees are arranged on the working surface of the driving gear disc, lugs corresponding to the separate lugs distributed on the working surface of the driving gear disc at an angle of 120 degrees are arranged on the supporting plate opposite to the back side of the driven gear disc, and the lugs are higher than the unidirectional teeth.

In a class of this embodiment, a tripping device is arranged on the bottom box, the action end of the tripping device is connected with the linkage rod through the connecting rod, and after the tripping device obtains a control signal from the automatic closing control unit on a circuit board, the circuit breaker actuating mechanism generates switch-off action.

In a class of this embodiment, the miniature intelligent circuit breaker with automatic closing function further comprises a mechanical self-locking mechanism which makes the circuit breaker actuating mechanism fail to complete the closing action in the case of short circuit.

In a class of this embodiment, the mechanical self-locking mechanism comprises: a limit rod, a metal triggering piece, and a linkage block; a hooked part is arranged at one end of the limit rod, and a hole formed on the upper cover extends out from the other end of the limit rod; a hinge shaft is arranged in the middle of the metal triggering piece, and a push-out end is arranged at the upper end of the metal triggering piece; the linkage block is propped with the push-out end of the metal triggering piece and rotates to drive the linkage rod to rotate.

In a class of this embodiment, a through groove is formed in the middle of the limit rod, a transverse rod is fixedly connected with the supporting plate and penetrates the through groove, and a return spring is arranged in the through groove.

In a class of this embodiment, the automatic closing control unit comprises:

- a power collection subunit acquiring a power signal from a phase line and conducting rectifying and filtering; and
- a motor motion control subunit obtaining the power signal, allowing the motor to move when receiving the closing command, and ultimately realizing the closing action of the circuit breaker actuating mechanism.

To have protection function at short circuit or abnormal electricity conditions, the automatic closing control unit further comprises:

- a short-circuit detection circuit used for detecting whether a short circuit occurs as well as generating a tripping control signal when a short circuit occurs; and
- a tripping subunit used for allowing the circuit breaker actuating mechanism to generate switch-off action after receiving the tripping control signal.

To prevent the circuit breaker from switching on automatically under the condition without eliminating the abnormal conditions, the automatic closing control unit further comprises: a self-locking control subunit; the self-locking control subunit is connected with the motor motion control subunit and receives a self-locking control signal (indicating the short-circuit conditions) output by the short-circuit detection subunit, so that the motor motion control subunit enables the motor does not to generate action.

To achieve the remote control, for example, for prepayment, the miniature intelligent circuit breaker with automatic closing function further comprises an external control unit; the external control unit is connected with the tripping subunit and the motor motion control subunit respectively and receives an external control signal, so as to control the tripping device and the motor.

In a class of this embodiment, the short-circuit detection circuit comprises at least a short-circuit detection element arranged for at least one phase line and connected with a decision element, and the decision element generates the self-locking control signal and the tripping control signal according to the state of the short-circuit detection element in the case of short circuit.

In a class of this embodiment, the miniature intelligent circuit breaker with automatic closing function further comprises a temperature detection subunit for detecting the temperature of the phase line and generates a self-locking control signal and/or tripping control signal when the temperature reaches the threshold value.

In a class of this embodiment, the temperature detection subunit comprises a temperature detection element arranged for at least one phase line and connected with the decision element, and the decision element generates the self-locking control signal and/or tripping control signal according to the state of the temperature detection element at the abnormal temperature.

In a class of this embodiment, the miniature intelligent circuit breaker with automatic closing function further comprises a limit subunit which sends out a control signal to the motor motion control subunit after the circuit breaker is closed, so as to enable the motor to stop.

In a class of this embodiment, the limit subunit comprises a photoelectric coupler, and after the circuit breaker is closed, a stage change is generated at the output terminal and transmitted to the motor motion control subunit to enable the motor to stop.

Compared with the prior art, the invention has the benefits that the automatic closing of the circuit breaker can be realized, the circuit breaker can be disconnected when a short circuit occurs, the temperature is too high or other abnormal electricity conditions occur, and the circuit breaker cannot be automatically closed under the condition without eliminating the abnormal conditions, thus the built-in intelligent circuit breaker and the miniature intelligent circuit breaker are suitable for the remote control of the circuit breaker and are basic products for the development of the smart grid.

DETAILED DESCRIPTION OF THE EMBODIMENTS

The invention is explained in further detail below with reference to the attached drawings.

Figure 1A:
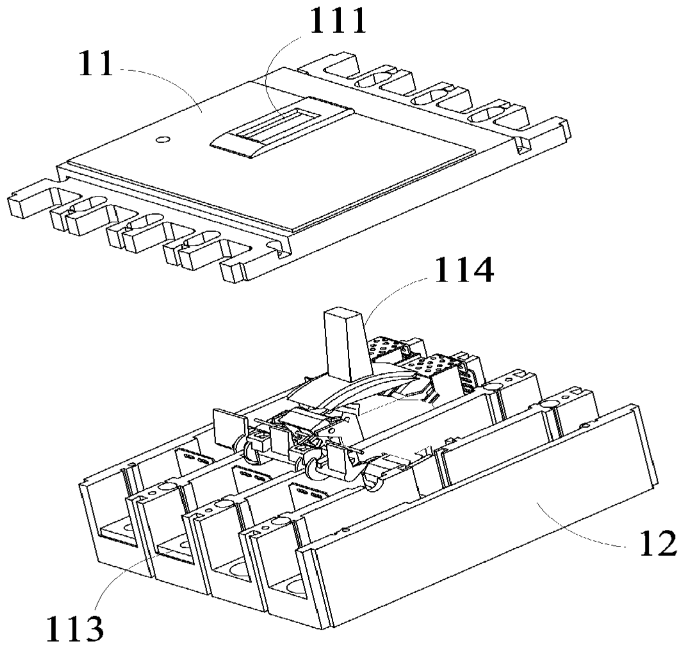
FIG. 1A (Prior art)
FIG. 1A is an exploded view of a circuit breaker in accordance with one embodiment in the prior art.
Figure 1B:
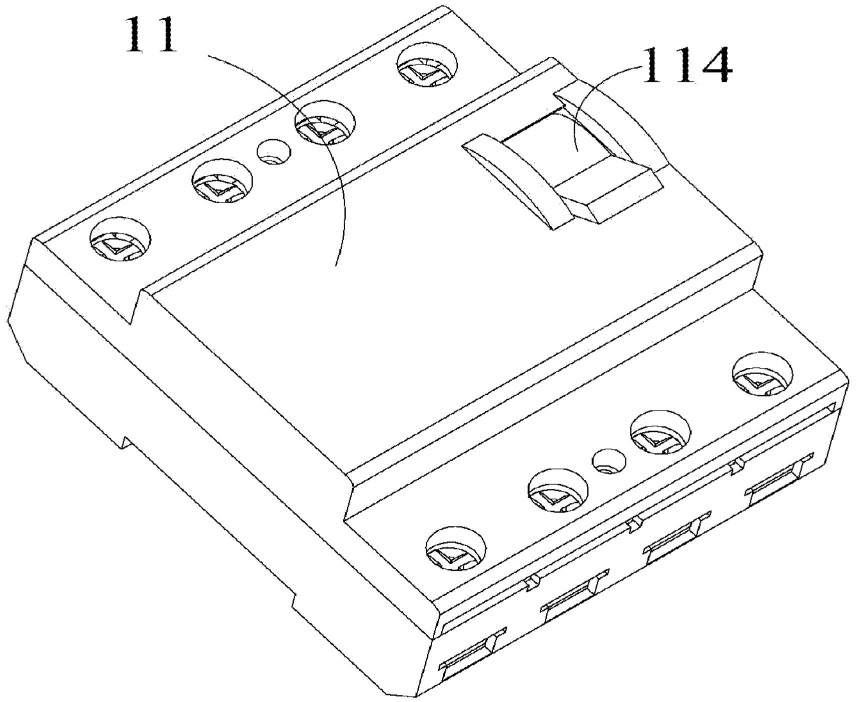
FIG. 1B (Prior art)
FIG. 1B is a three-dimensional diagram of a miniature circuit breaker in accordance with one embodiment in the prior art.
Figure 1C:
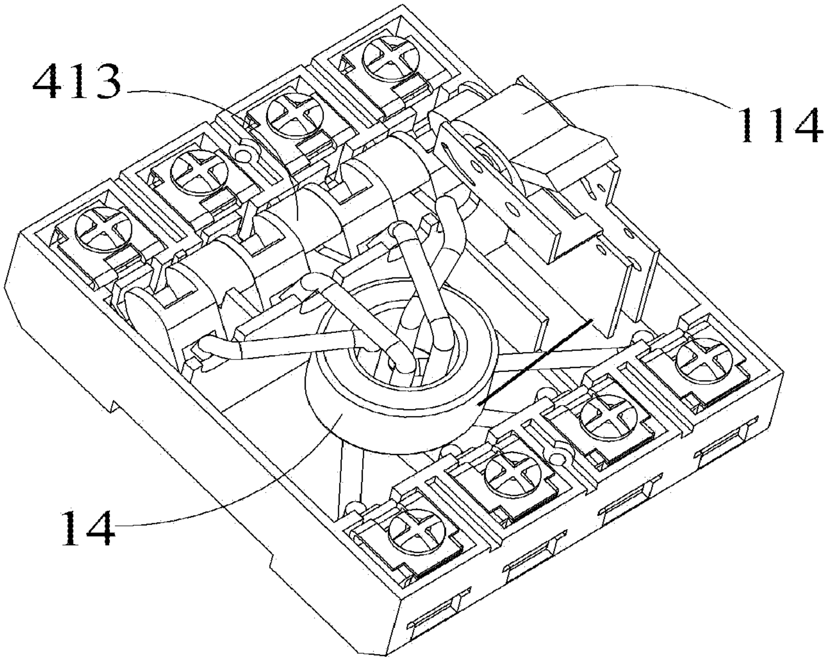
FIG. 1C (Prior art)
FIG. 1C is a front view of an internal structure of a miniature circuit breaker in accordance with one embodiment in the prior art.
Figure 2:
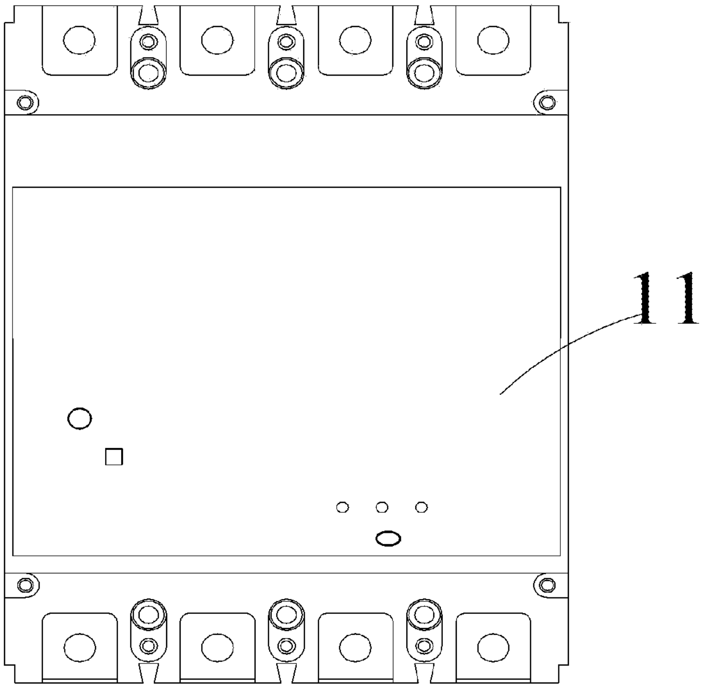
FIG. 2 is a front view of a built-in intelligent circuit breaker with automatic closing function in accordance with one embodiment of the invention.

As shown in FIG. 2 for a front view of a built-in intelligent circuit breaker with automatic closing function. The built-in intelligent circuit breaker with automatic closing function comprises a circuit breaker body, wherein the circuit breaker body comprises a box body, the box body comprises an upper cover 11, a bearing plate 10 and a bottom box 12, and the bottom box 12 is provided with a wire inlet port 115 and a wire outlet port 113 for realizing the leading-in and leading-out of the phase lines and zero lines; a longitudinal partition board is arranged between every two incoming lines (phase line and zero line) for separation, and is internally connected with a leading-in metal sheet.

The circuit breaker actuating mechanism comprises a poke rod 114 and a linkage component connected with the poke rod 114, wherein a movable contact arm is hinged at the lower end of a linkage rod of the linkage component, when the linkage component rotates under the action of the poke rod 114, the movable contact arm is driven to rotate, a moving contact on the movable contact arm is in contact with a stationary contact on a static contact piece, and the static contact piece is connected with a wire outlet end on the bottom box, so that the purpose of transmitting current out (in the prior art) is achieved.

The built-in intelligent circuit breaker with automatic closing function comprises a mechanical part and a control part, and as to the automatic closing function, an automatic closing mechanical unit and an automatic closing control unit can be included. The built-in intelligent circuit breaker with automatic closing function comprises a circuit breaker body, wherein the circuit breaker body comprises a box body, a circuit breaker actuating mechanism, a wire inlet end 115 and a wire outlet end 113 are arranged in the box body, and the circuit breaker actuating mechanism is triggered through a poke rod positioned in the box body.

Figure 3A:
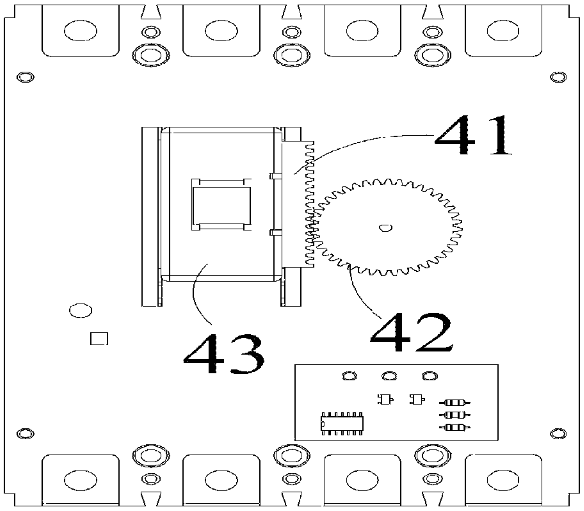
FIG. 3A is a front view of an automatic closing mechanical unit of a built-in intelligent circuit breaker in accordance with embodiment 1 of the invention, with an upper cover taken down.
Figure 3B:
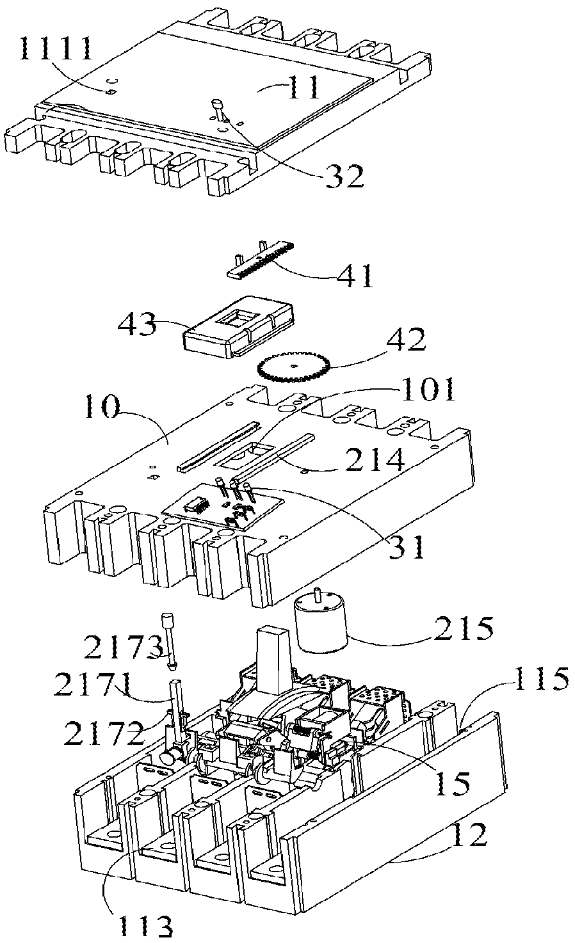
FIG. 3B is a three-dimensional exploded view of an automatic closing mechanical unit of a built-in intelligent circuit breaker in accordance with embodiment 1 of the invention.

As shown in FIG. 3A and FIG. 3B for a front view and a three-dimensional exploded view of Embodiment 1 of the automatic closing mechanical unit of the built-in intelligent circuit breaker with automatic closing function, with the upper cover taken down. The built-in intelligent circuit breaker with automatic closing function comprises a bearing plate 10, wherein the bearing plate 10 is arranged between the upper cover 11 and the bottom box 12 and combined with an electrical operating mechanism, the electrical operating mechanism is provided with an execution end connected with the poke rod 114, and the poke rod 114 is further switched in the on/off state during the operation of the electrical operating mechanism under the control of the automatic closing control unit.

The electrical operating mechanism comprises a motor 215 and an intermediate transmission mechanism, wherein the intermediate transmission mechanism is arranged on the bearing plate 10 and comprises a pinion-and-rack mechanism and a shifting part 43, and the shifting part 43 is connected with the poke rod 114; the motor 215 is arranged in the bottom box 12, and the rotation of the motor 215 is transformed into reciprocating action of the shifting part 43 through the pinion-and-rack mechanism, so that the poke rod 114 is switched in the on/off state.

The shifting part 43 is a frame body, the poke rod 114 penetrates the middle of the frame body of the shifting part 43, and slide rails capable of moving along a chute 214 are arranged on two sides of the frame body of the shifting part 43.

The pinion-and-rack mechanism comprises:

A rack 41 combined with the frame body of the shifting part 43 and capable of driving the frame body of the shifting part 43 to make reciprocating motion;

A first gear 42 arranged on the bearing plate 10 and meshed with the rack 41; an output shaft of the motor 215 is connected with the first gear 42;

At least one guide limit groove is longitudinal and formed on a lateral wing of the frame body of the shifting part 43.

More preferably, the pinion-and-rack mechanism further comprises a speed reducer; the speed reducer is arranged on the output shaft of the motor 215, and an output shaft of the speed reducer is fixedly connected with the first gear 42.

More preferably, a safety switch 32 is arranged on the upper cover 11 and corresponds to a corresponding latching switch on the automatic closing control unit, so as to prevent the circuit breaker from being closed under the action of the motor 215 during the maintenance.

More preferably, a plurality of status indicator lamps 31 are arranged on a circuit control board 3, and correspond to through holes reserved on the upper cover 11 after the upper cover 11 is installed.

A tripping device 15 is arranged on the bottom box 12, and the action end of the tripping device 15 is connected with the linkage rod of the linkage component through a connecting rod. When the tripping device 15 obtains a corresponding control signal from a control circuit on the circuit control board 3, a tripping action is generated, that is, the action end of the tripping device 15 pushes the linkage rod to move, and the moving contact is further separated from the stationary contact. The tripping device 15 is an electromagnet, and the action end of the tripping device 15 serves as its armature end.

When any abnormal condition of short-circuit or overcurrent occurs, more preferably, a mechanical self-locking mechanism can also be included. The mechanical self-locking mechanism comprises a limit rod 2171, wherein a hooked part is arranged at one end of the limit rod 2171 and hooked in a groove formed on an axial linkage rod, the axial linkage rod can swing and is propped against with a linkage block of the linkage component, and the other end of the limit rod 2171 can extend out (It at least is aligned with the hole 1111 and does not extend out) from a hole 1111 formed on the upper cover 11; a through groove is formed in the middle of the limit rod 2171, a fixing part 2172 is fixedly connected with the upper cover 11 from the lower part, and penetrates the through groove, and a return spring is arranged in the through groove; when an abnormal condition occurs, the tripping device moves for triggering the axial linkage rod to rotate, the linkage block of the linkage component is driven to rotate, the moving contact is further separated from the stationary contact, the hooked part of the limit rod 2171 slips out of the groove at the moment, the limit rod 2171 moves upwards under the action of the return spring arranged in the through groove, and extends out of the hole 1111 on the upper cover, and the hooked part is propped against the axial linkage rod, so that the resetting is failed, that is, the self-locking is formed. In that situation, the indication effect of the extending limit rod 2171 shows that the off state of the present circuit breaker is caused by abnormality, and if the circuit breaker is expected to be closed, the extending limit rod 2171 is artificially pressed back through a rod 2173, and the hooked part is newly embedded in the groove, so as to realize unlocking.

Certainly, the above adopts mechanical self-locking, and when the electronic self-locking is adopted, the artificial unlocking is not required generally, thus it is more convenient and more timely.

Figure 4A:
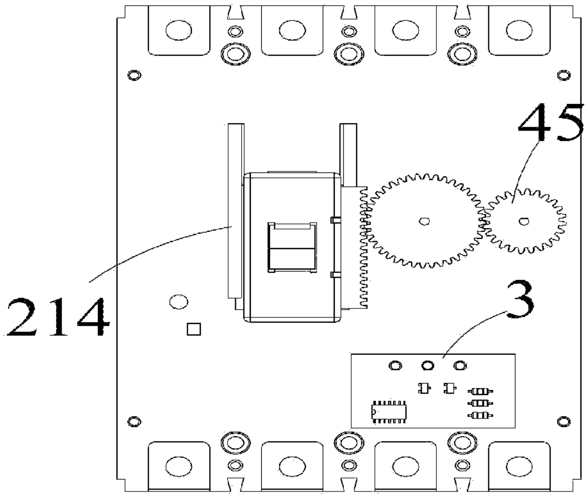
FIG. 4A is a front view of an automatic closing mechanical unit of a built-in intelligent circuit breaker in accordance with embodiment 2 of the invention, with an upper cover taken down.
Figure 4B:
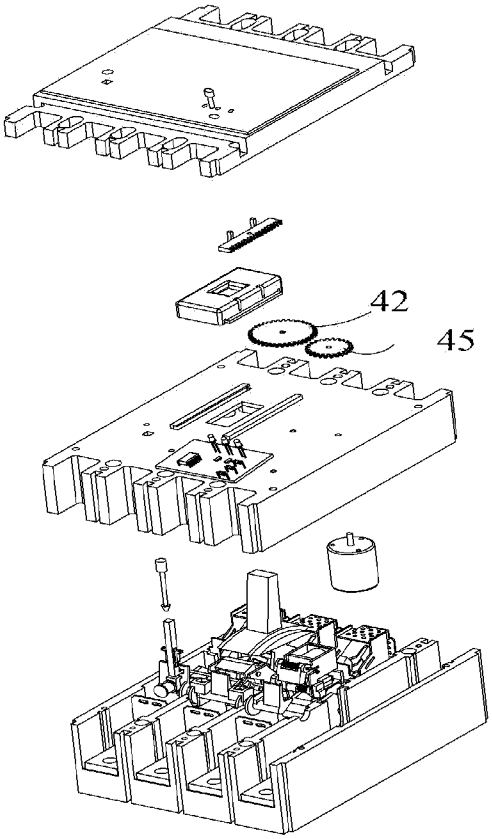
FIG. 4B is a three-dimensional exploded view of an automatic closing mechanical unit of a built-in intelligent circuit breaker in accordance with embodiment 2 of the invention.

As shown in FIG. 4A and FIG. 4B for a front view and a three-dimensional exploded view of Embodiment 2 of the automatic closing mechanical unit of the built-in intelligent circuit breaker with automatic closing function, with the upper cover taken down. The difference from Embodiment 1 lies in that the two-stage gear transmission mode is adopted here, a second gear 45 is also included, and the second gear 45 is arranged on the bearing plate 10 and meshed with the first gear 42. The motor 215 positioned in the bottom box 12 is fixedly connected with the second gear 45.

Figure 5A:
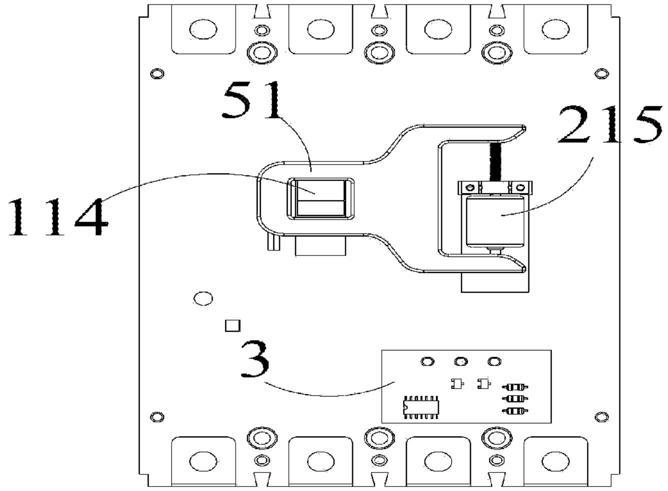
FIG. 5A is a front view of an automatic closing mechanical unit of a built-in intelligent circuit breaker in accordance with embodiment 3 of the invention, with an upper cover taken down.
Figure 5B:
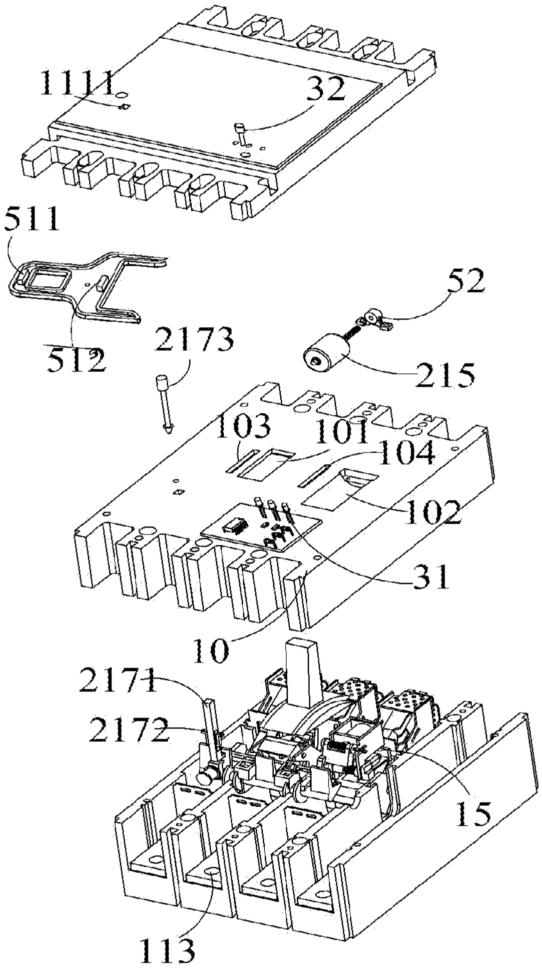
FIG. 5B is a three-dimensional exploded view of an automatic closing mechanical unit of a built-in intelligent circuit breaker in accordance with embodiment 3 of the invention.

As shown in FIG. 5A and FIG. 5B for a front view and a three-dimensional exploded view of Embodiment 3 of the automatic closing mechanical unit of the built-in intelligent circuit breaker with automatic closing function, with the upper cover taken down. The difference from Embodiment above mainly lies in that the electrical operating mechanism comprises a translational mechanism and a shifting part which are arranged on the bearing plate, and the shifting part is propped against the poke rod 114.

The translational mechanism pushes the shifting part to make reciprocating motion, so that the poke rod 114 is switched in the on/off state.

The shifting part adopts a shift fork 51, a shift opening is formed at one end of the shift fork 51, the poke rod 114 is arranged in the shift opening, and a push opening is formed at the other end of the shift fork 51. A first guide groove 103 and a second guide groove 104 which are parallel to the notch groove 11 are formed on the bearing plate 10, and a first bulge 511 and a second bulge 512 are arranged on the bottom surface of the shift fork 51 and embedded in the guide grooves respectively.

The translational mechanism comprises:

A motor 215; a threaded column is arranged on an output shaft of the motor 215 and provided with an end, and a propping part is arranged on the bottom side of the motor 215; a notch groove 102 is formed on the bearing plate 10, and the motor 215 is arranged in the notch groove 102;

A guide support seat 52; the guide support seat 52 is arranged on the bearing plate 10 and provided with an inner threaded opening, and the threaded column is screwed into the inner threaded opening;

Wherein, the end of the threaded column and the propping part correspond to the two inner side walls of the push opening of the shift fork 51 respectively.

When the motor 215 rotates, it horizontally moves relative to the guide support seat 52 and is propped against the push opening of the shift fork 51, and the shift fork 51 moves along the first guide groove 103 and the second guide groove 104, so that the poke rod 114 is switched in the on/off state.

Figure 6A:
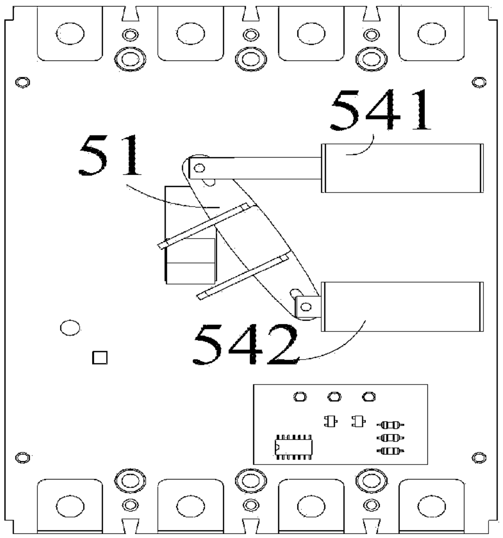
FIG. 6A is a front view of an automatic closing mechanical unit of a built-in intelligent circuit breaker in accordance with embodiment 4 of the invention, with an upper cover taken down.
Figure 6B:
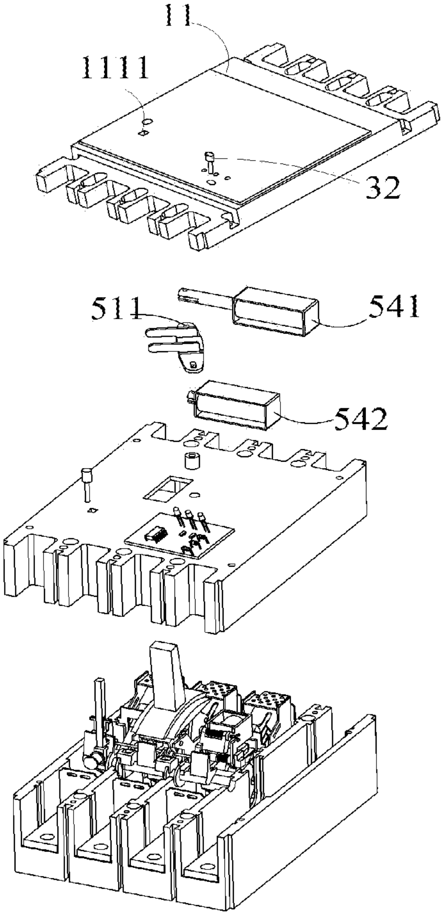
FIG. 6B is a three-dimensional exploded view of an automatic closing mechanical unit of a built-in intelligent circuit breaker in accordance with embodiment 4 of the invention.

As shown in FIG. 6A and FIG. 6B for a front view and a three-dimensional exploded view of Embodiment 4 of the automatic closing mechanical unit of the built-in intelligent circuit breaker with automatic closing function, with the upper cover taken down. The difference from Embodiment 3 lies in that the shifting part adopts a shift fork 51, a shift opening is formed at one end of the shift fork 51, the poke rod 114 is arranged in the shift opening, connecting holes 511 are formed on two wings of the shift fork, and the middle of the shift fork 51 is coupled with the bearing plate 10.

The translational mechanism comprises a pair of electromagnets 541 and 542, which are fixedly arranged on the bearing plate 10; the armature ends of the two electromagnets 541 and 542 are hinged with the connecting holes 511; the two electromagnets 541 and 542 are not in the same working states, that is, one electromagnet is in the state that the armature extends out, and the other electromagnet is in the state that the armature does not extend out, so that a link mechanism is formed between the translational mechanism and the shift fork, that is, the purpose of switching the poke rod 114 in the on/off state is achieved through the alternant changes in state of the two electromagnets 541 and 542.

Figure 7A:
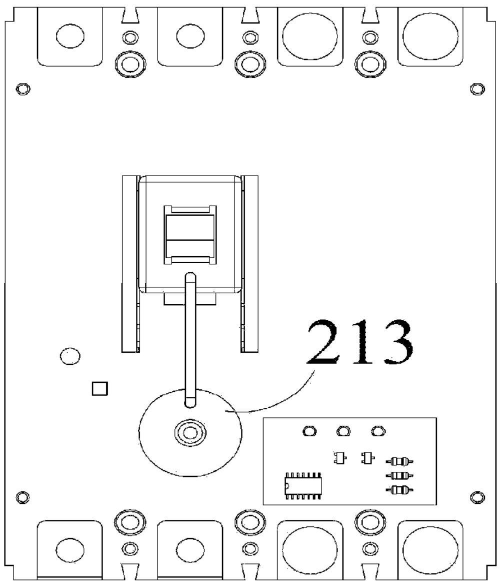
FIG. 7A is a front view of an automatic closing mechanical unit of a built-in intelligent circuit breaker in accordance with embodiment 5 of the invention, with an upper cover taken down.
Figure 7B:
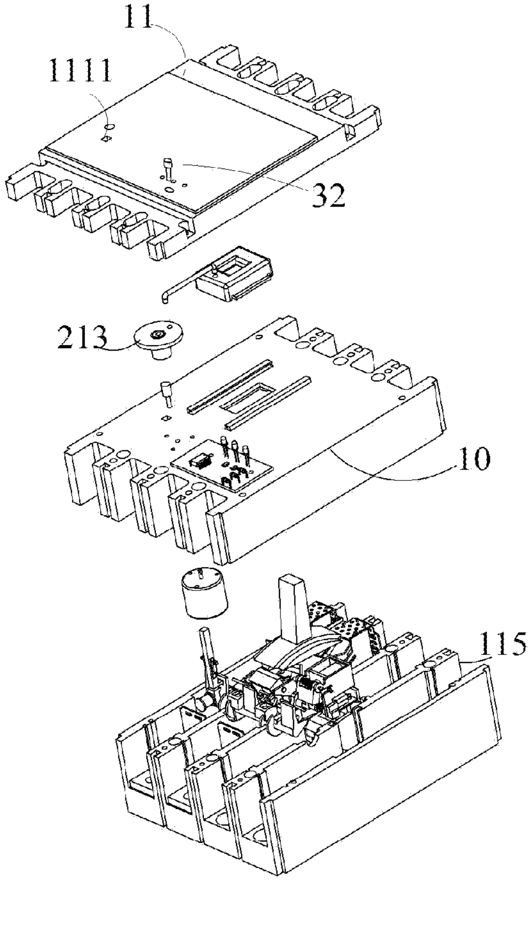
FIG. 7B is a three-dimensional exploded view of an automatic closing mechanical unit of a built-in intelligent circuit breaker in accordance with embodiment 5 of the invention.

As shown in FIG. 7A and FIG. 7B for a front view and a three-dimensional exploded view of Embodiment 5 of the automatic closing mechanical unit of the built-in intelligent circuit breaker with automatic closing function, with the upper cover taken down. The difference from the embodiment above mainly lies in that the electrical operating mechanism comprises a crank part and a shifting part, and the shifting part is connected with the poke rod 114; a motor 215 is arranged in the bottom box 12, and the rotation of the motor 215 is transformed into reciprocating action of the shifting part through the crank part under the control of the automatic closing control unit, so that the poke rod is switched in the on/off state.

The crank part in the embodiment comprises a ratchet-pawl mechanism and a connecting rod; the ratchet-pawl mechanism comprises a housing, a core and a rolling bearing; the housing is provided with an internal tooth, the internal tooth adopts a ratchet, and a connecting hole is formed on the disc surface of the housing; the core is arranged in the internal tooth, at least one pawl is arranged on the outer edge of the core, an elastic element is arranged between the pawl and the core, and the pawl corresponds to the ratchet; the rolling bearing is arranged between the housing and the core.

The shifting part is a frame body 211, the poke rod 114 penetrates the middle of the frame body 211, slide rails capable of sliding along a chute 214 are arranged on two sides of the frame body 211, and a connecting hole is formed on the frame body 211; the connecting rod 212 is arranged between the connecting hole of the housing and the connecting hole of the frame body 211, and the output shaft of the motor 215 is arranged in a shaft hole of the core; when the motor 215 rotates, the core drives the housing to rotate, and the connecting rod 212 further pulls or pushes the shifting part to move along the chute 214, so that the poke rod 114 is switched in the on/off state.

Figure 8A:
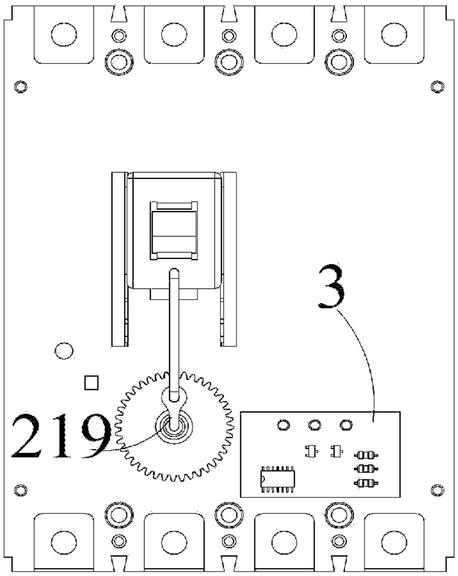
FIG. 8A is a front view of an automatic closing mechanical unit of a built-in intelligent circuit breaker in accordance with embodiment 6 of the invention, with an upper cover taken down.
Figure 8B:
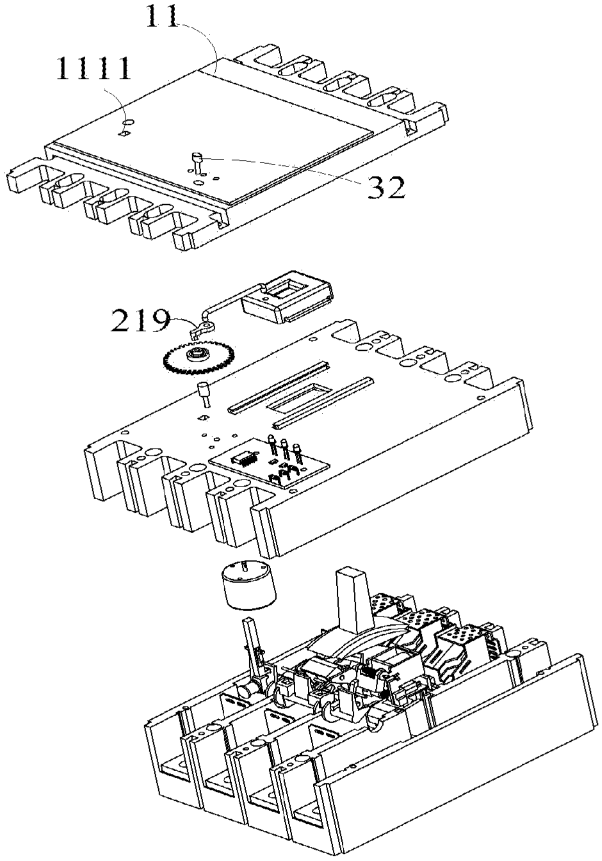
FIG. 8B is a three-dimensional exploded view of an automatic closing mechanical unit of a built-in intelligent circuit breaker in accordance with embodiment 6 of the invention.
Figure 9A:
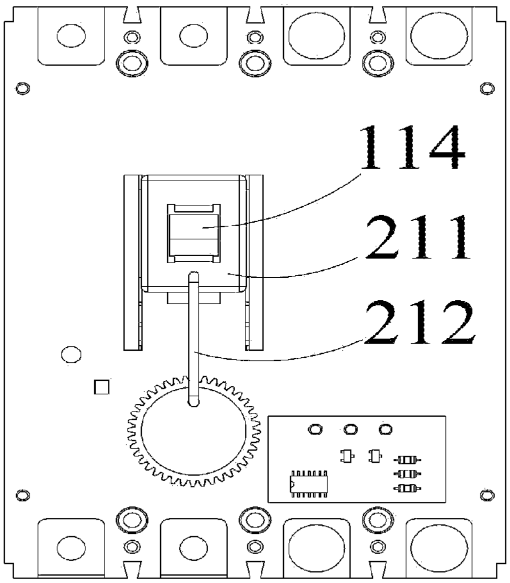
FIG. 9A is a front view of an automatic closing mechanical unit of a built-in intelligent circuit breaker in accordance with embodiment 7 of the invention, with an upper cover taken down.
Figure 9B:
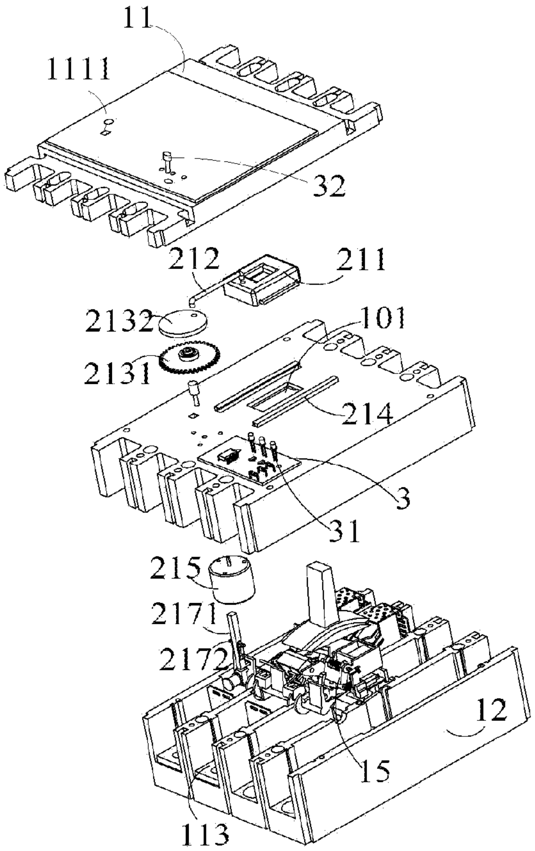
FIG. 9B is a three-dimensional exploded view of an automatic closing mechanical unit of a built-in intelligent circuit breaker in accordance with embodiment 7 of the invention.

As shown in FIG. 8A and FIG. 8B for a front view and a three-dimensional exploded view of Embodiment 6 of the automatic closing mechanical unit of the built-in intelligent circuit breaker with automatic closing function, with the upper cover taken down. The difference from Embodiment 5 lies in that a connecting hole is not obliquely formed on the housing any more, however, an adapting rod 219 is additionally arranged, one end of the adapting rod 219 is fixedly arranged at the middle of the housing, a connecting hole is formed at the other end of the adapting rod 219, the connecting rod 212 is arranged between the connecting hole of the adapting rod 219 and the connecting hole of the frame body 211, and the output shaft of the motor 215 is arranged in the shaft hole of the core; when the motor rotates, the core drives the housing to rotate, and the adapting rod 219 further drives the connecting rod 212 to pull or push the shifting part to move along the chute 214, so that the poke rod 114 is switched in the on/off state.

Figure 13A:
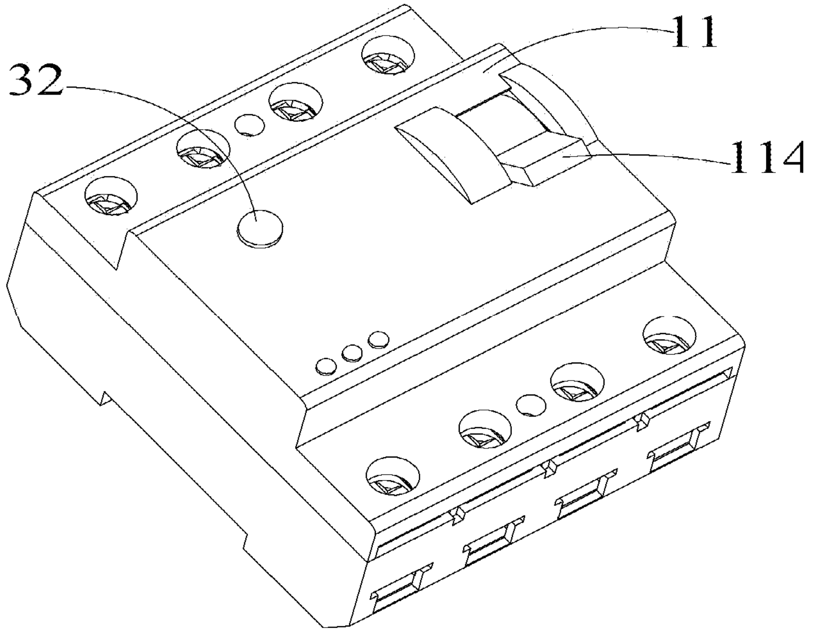
FIG. 13A is a three-dimensional view of a miniature intelligent circuit breaker in accordance with embodiment 1 of the invention.
Figure 13B:
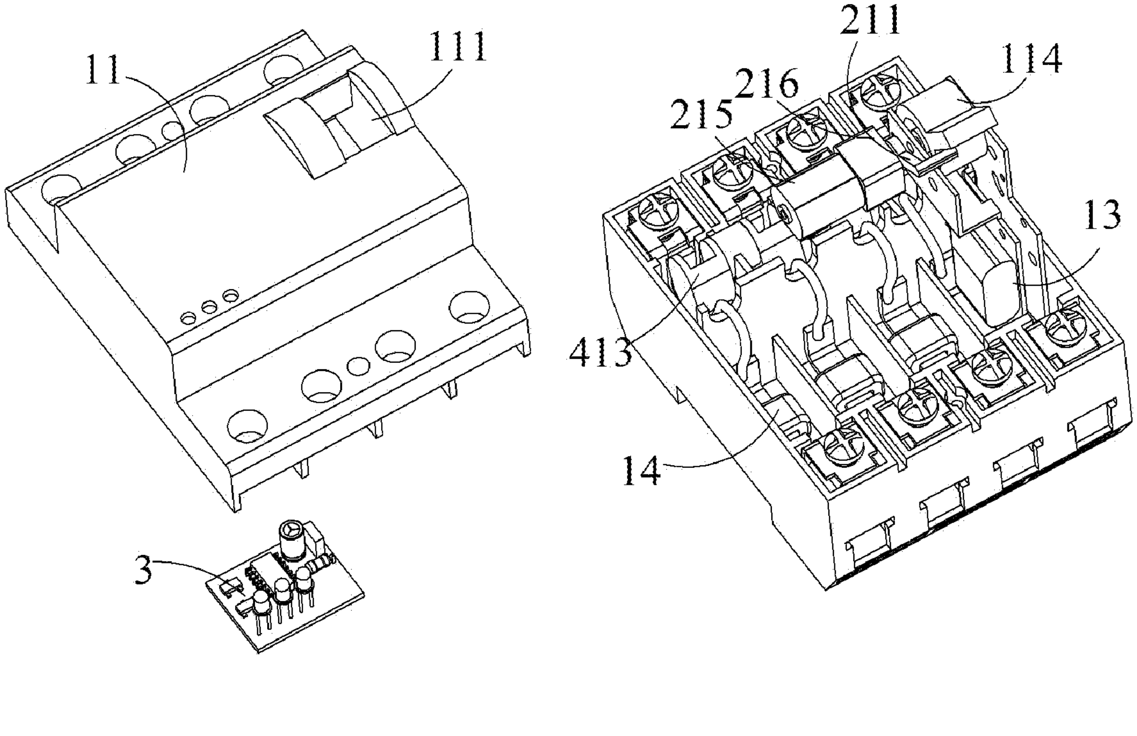
FIG. 13B is a main body exploded view of a miniature intelligent circuit breaker in accordance with embodiment 1 of the invention, with an upper cover opened.

As shown in FIG. 13A and FIG. 13B for a front view and a three-dimensional exploded view of Embodiment 7 of the automatic closing mechanical unit of the built-in intelligent circuit breaker with automatic closing function, with the upper cover taken down. The difference from Embodiment 5 lies in that a connecting hole is not obliquely formed on the housing 2131 any more, however, a disc 2132 is additionally arranged and fixedly arranged on the housing 2131, a connecting hole is obliquely formed on one side of the disc 2132, the connecting rod 212 is arranged between the connecting hole of the disc 2132 and the connecting hole of the frame body 211, and the output shaft of the motor 215 is arranged in the shaft hole of the core; when the motor 215 rotates, the core drives the housing 2131, and the disc 2132 further drives the connecting rod 212 to pull or push the shifting part to move along the chute 214, so that the poke rod 114 is switched in the on/off state.

Figure 10A:
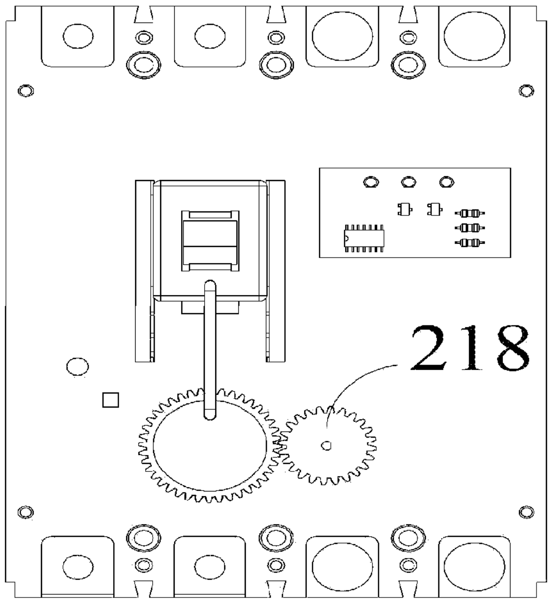
FIG. 10A is a front view of an automatic closing mechanical unit of a built-in intelligent circuit breaker in accordance with embodiment 8 of the invention, with an upper cover taken down.
Figure 10B:
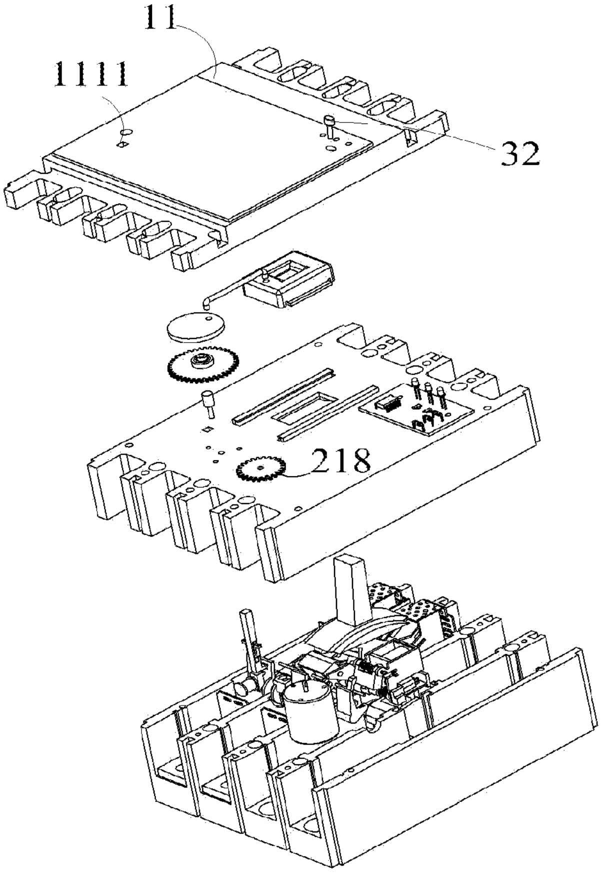
FIG. 10B is a three-dimensional exploded view of an automatic closing mechanical unit of a built-in intelligent circuit breaker in accordance with embodiment 8 of the invention.

As shown in FIG. 10A and FIG. 10B for a front view and a three-dimensional exploded view of Embodiment 8 of the automatic closing mechanical unit of the built-in intelligent circuit breaker with automatic closing function, with the upper cover taken down. The difference from Embodiment 7 lies in that a gear 218 is also included, the gear 218 is arranged on the bearing plate 10 and connected with the output shaft of the motor 215, teeth are arranged on the outer edge of the housing 2131, and the gear 218 is meshed with the housing 2131; when the motor 215 rotates to drive the gear 218 to rotate, the housing 2131 is driven to rotate, the disc 2132 further drives the connecting rod 212 to pull or push the shifting part to move along the chute 214, and ultimately, the poke rod 114 is switched in the on/off state.

Figure 11A:
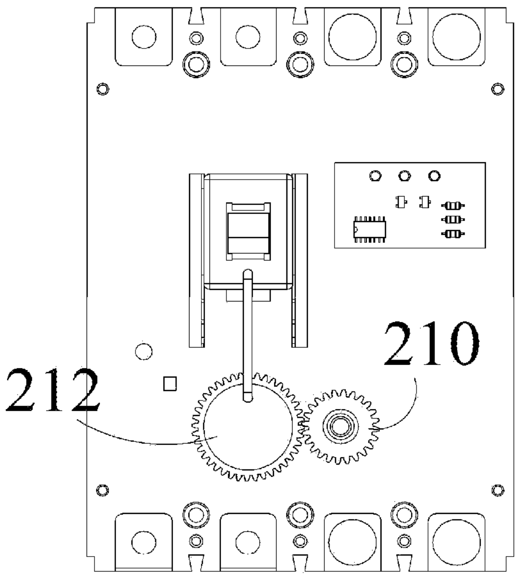
FIG. 11A is a front view of an automatic closing mechanical unit of a built-in intelligent circuit breaker in accordance with embodiment 9 of the invention, with an upper cover taken down.
Figure 11B:
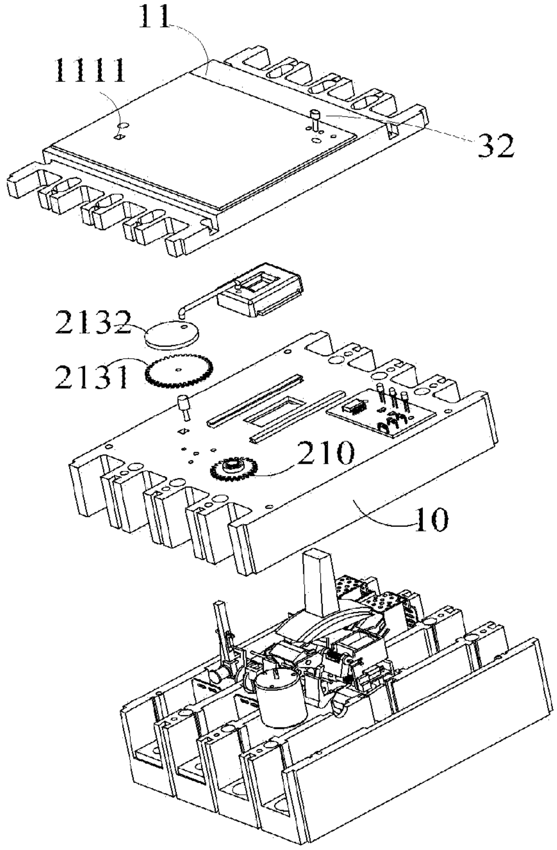
FIG. 11B is a three-dimensional exploded view of an automatic closing mechanical unit of a built-in intelligent circuit breaker in accordance with embodiment 9 of the invention.

As shown in FIG. 11A and FIG. 11B for a front view and a three-dimensional exploded view of Embodiment 9 of the automatic closing mechanical unit of the built-in intelligent circuit breaker with automatic closing function, with the upper cover taken down. The difference from Embodiment 7 lies in that the positions of the ratchet-pawl mechanism and the gear are exchanged, a disc 2132 is fixedly arranged on a gear 2131, a connecting hole is obliquely formed on the disc 2132, and the core is fixedly connected with the motor (actually, a connecting hole can also be formed on the gear 2131, and then the disc 2132 is not required); when the motor 215 rotates to drive the core to rotate, a housing 210 is driven by the core to rotate, the gear 2131 is further driven to rotate, the disc 2132 further drives the connecting rod 212 to pull or push the shifting part to move along the chute 214, and ultimately, the poke rod 114 is switched in the on/off state.

Figure 12A:
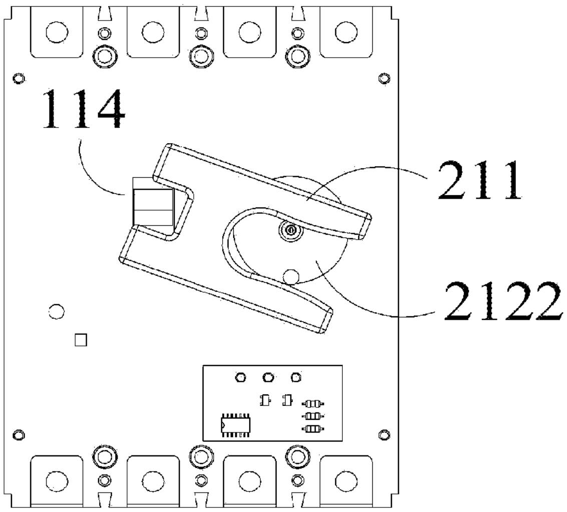
FIG. 12A is a front view of an automatic closing mechanical unit of a built-in intelligent circuit breaker in accordance with embodiment 10 of the invention, with an upper cover taken down.
Figure 12B:
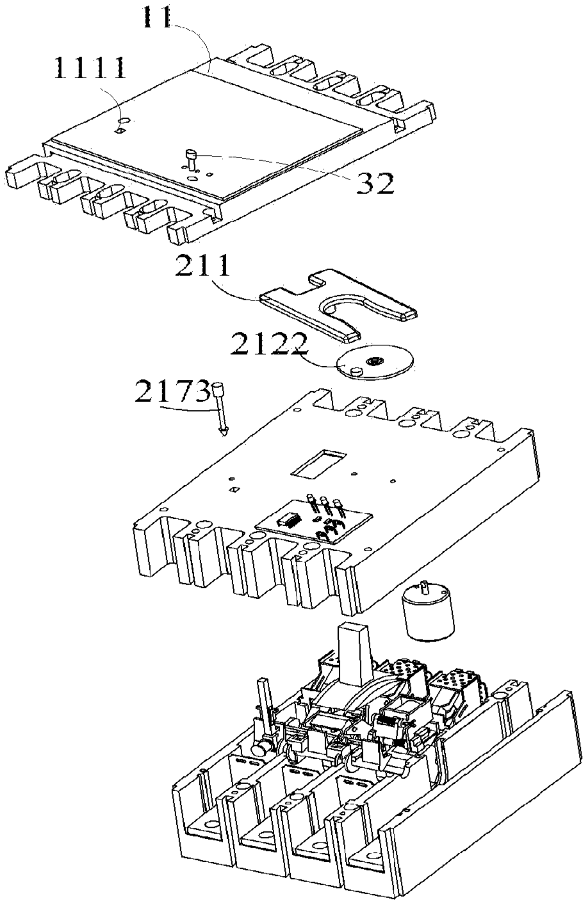
FIG. 12B is a three-dimensional exploded view of an automatic closing mechanical unit of a built-in intelligent circuit breaker in accordance with embodiment 10 of the invention.
Figure 12C:
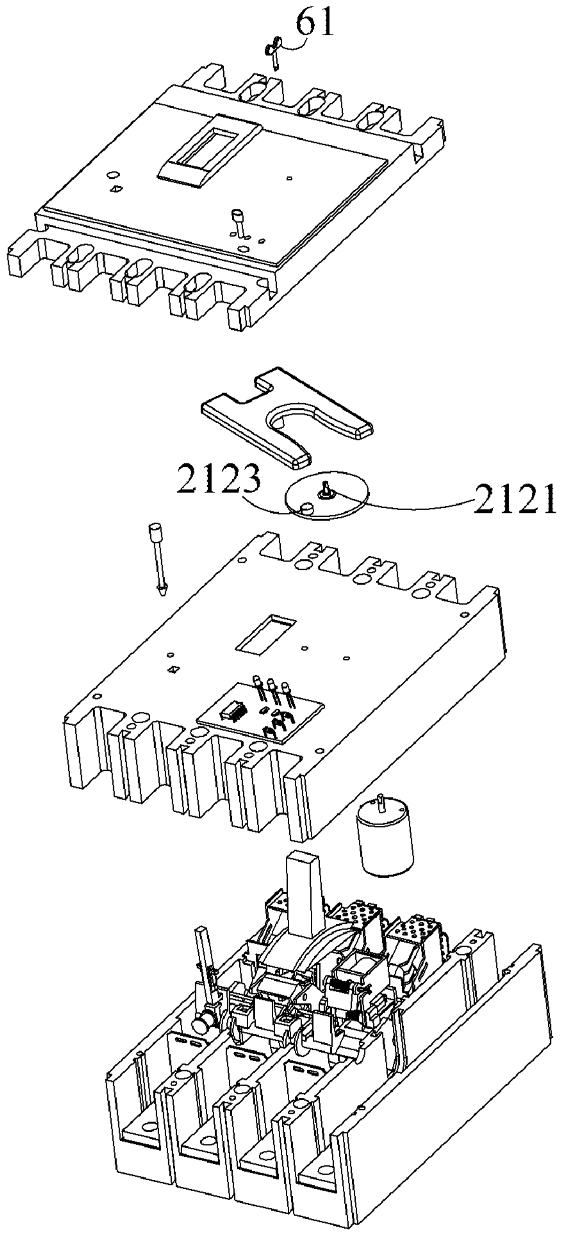
FIG. 12C is a preferable scheme for a three-dimensional exploded view of an automatic closing mechanical unit of a built-in intelligent circuit breaker in accordance with embodiment 10 of the invention, with an upper cover taken down.

As shown in FIG. 12A and FIG. 12B for a front view and a three-dimensional exploded view of Embodiment 10 of the automatic closing mechanical unit of the built-in intelligent circuit breaker with automatic closing function, with the upper cover taken down. The crank part and the shifting part here have differences with the Embodiments 5-10, the shifting part adopts a shift fork 211, the middle of the shift fork 211 is axially arranged on the bearing plate 10, a shift opening is formed at one end of the shift fork 211, the poke rod 114 is arranged in the shift opening, and a push opening is formed at the other end of the shift fork 211; a push rod 2123 is obliquely arranged on a housing 212 of the ratchet-pawl mechanism; when the motor 215 rotates to drive the core to rotate, the housing 212 is further driven to rotate, the push rod 2123 further pushes the push opening, the shift fork 211 rotates around an axis, and ultimately, the poke rod 114 positioned in the shift opening is switched in the on/off state.

As shown in FIG. 13A and FIG. 13B for a front view and a three-dimensional exploded view of Embodiment 1 of the miniature intelligent circuit breaker with automatic closing function, with the upper cover taken down. The miniature intelligent circuit breaker with automatic closing function can be a three-phase or two-phase circuit breaker, and the phase number does not change the implementation on the structure during the process of fulfilling the automatic closing function, thus the mechanical part of the miniature intelligent circuit breaker with automatic closing function shall be described by taking the three-phase circuit breaker as an example.

The miniature intelligent circuit breaker with automatic closing function comprises a circuit breaker body, wherein the circuit breaker body comprises a box body, the box body comprises an upper cover 11 and a bottom box 12, and a wire outlet port 115 and a wire inlet port 113 for realizing the leading-in and leading-out of the phase lines and zero lines are arranged on the bottom box 12; a longitudinal partition board is arranged between every two incoming lines (phase line and zero line) for separation, and is internally connected with a leading-in metal sheet.

Figure 13C:
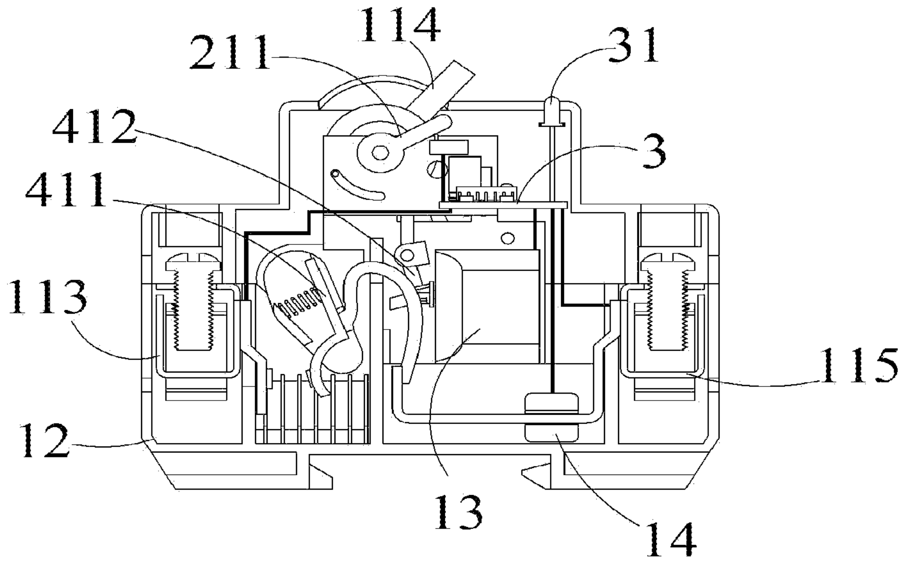
FIG. 13C is a side view of an internal structure of a miniature intelligent circuit breaker in accordance with embodiment 1 of the invention.

As shown in FIG. 13C for a side view of the internal structure of Embodiment 1 of the miniature intelligent circuit breaker with automatic closing function. The circuit breaker actuating mechanism comprises a poke rod 114 and a linkage rod 413 connected with the poke rod 114, it needs some clarification that the poke rod 114 is arranged with two states, that is, the poke rod 114 is arranged outside the box body by extending, and similar to the handle in the prior art, and the other state is that the poke rod 114 is arranged in the closed box body and not exposed outside the box body; the first state is adopted in the embodiment, a movable contact arm 411 is hinged at the lower end of the linkage rod 413, a spring is arranged at the small end of the linkage rod 413, and when the linkage rod 413 rotates under the action of the poke rod 114, the movable contact arm 411 is driven to rotate, a moving contact on the movable contact arm 411 is in contact with a stationary contact on a static contact piece, and the static contact piece is connected with a wire inlet end 113 on the bottom box, so that the purpose of transmitting current in is achieved; the movable contact arm 411 is connected with a leading-out metal sheet 115 through a metal connecting rod; an arc-extinguishing device is arranged at the lower part of the contact area between the moving contact and the stationary contact; meanwhile, a transverse partition board is arranged on the bottom box.

The miniature intelligent circuit breaker further comprises a current transformer 14 and an automatic closing mechanical unit; the current transformer 14 is arranged on the phase line; the automatic closing mechanical unit is used for fulfilling the automatic closing function of the circuit breaker and at least comprises a motor 215 and an intermediate transmission mechanism; the motor 215 is arranged at the upper part of the circuit breaker actuating mechanism; the motor outputs power, and the intermediate transmission mechanism drives a shift lever 211 propped against the poke rod 114 to move, so as to realize the automatic closing; meanwhile, a circuit board 3 is arranged in the bottom box and used for fulfilling the automatic closing function and other related control detection functions of the miniature intelligent circuit breaker with automatic closing function; the adopted intermediate transmission mechanism is a speed reducer 216, a travel switch 71 is arranged on the lower side of the shift lever 211 and triggered when the shift lever 211 moves to the specified position, and ultimately, the motor stops running.

A tripping device 13 is also arranged on the bottom box, and the action end of the tripping device 13 is connected with the linkage rod 413 through a connecting rod 412; when the tripping device 13 obtains a corresponding control signal from a control circuit on the circuit board 3, a tripping action is generated, that is, the action end of the tripping device 13 pushes the linkage rod 413 to move, so that the moving contact is separated from the stationary contact; the tripping device 13 is an electromagnet, and the action end serves as its armature end.

Figure 13D:
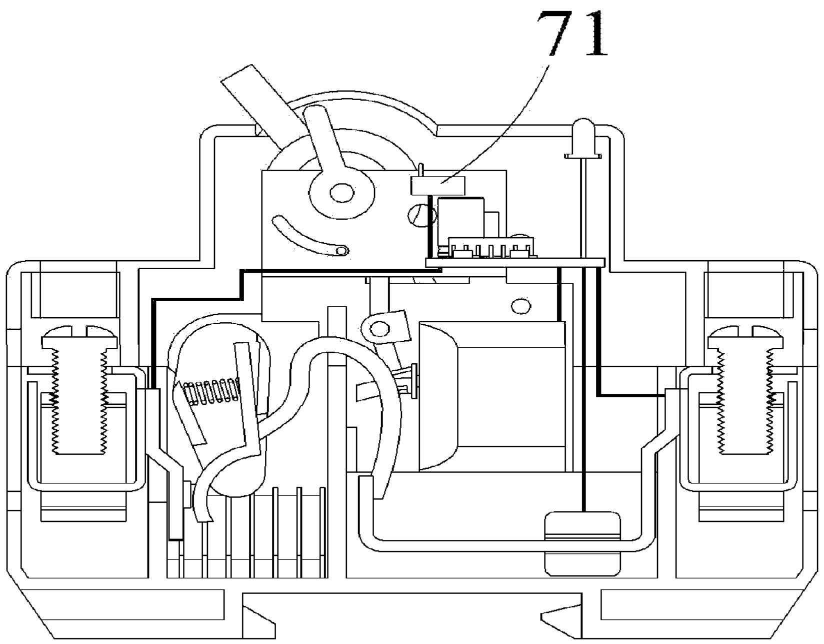
FIGS. 13D-13F are working state diagrams of an automatic closing mechanical unit of a miniature intelligent circuit breaker in accordance with embodiment 1 of the invention.
Figure 13E:
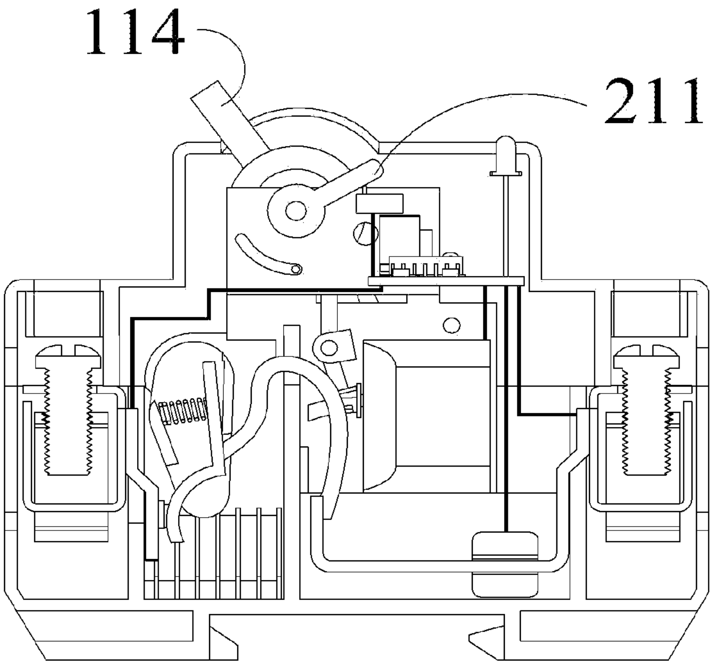
Figure 13F:
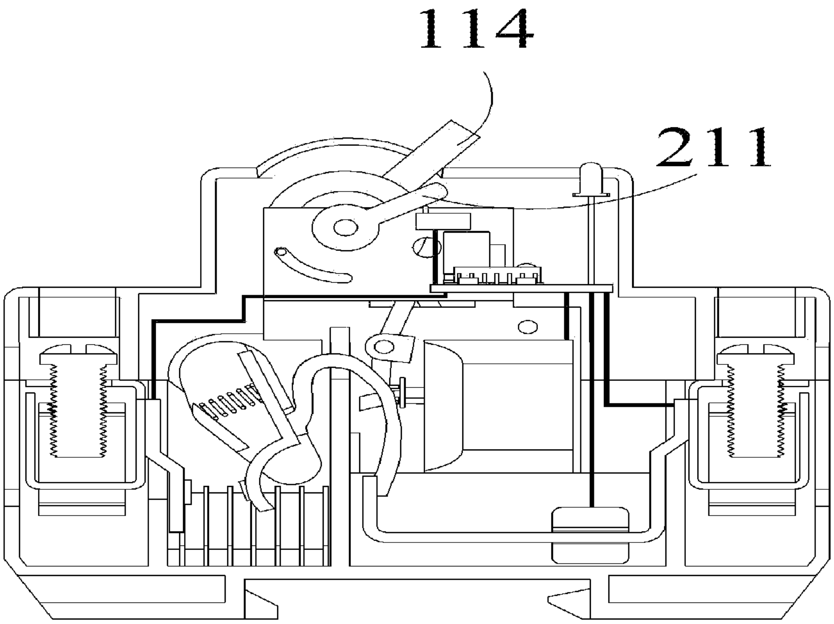

As shown in FIGS. 13D-13F for the working state diagrams of Embodiment 1 of the automatic closing mechanical unit of the miniature intelligent circuit breaker with automatic closing function. In the initial state (FIG. 13D), the miniature intelligent circuit breaker with automatic closing function is in the off state, the motor of the automatic closing mechanical unit does not receive the corresponding control signal at the moment; in the operating state (FIG. 13E), after receiving the corresponding control signal, the motor rotates to enable the miniature intelligent circuit breaker with automatic closing function to be closed, and when the poke rod 114 moves to the closed position, the shift lever 211 is in contact with the travel switch 71, and then the motor 215 stops running; in the reset state (FIG. 13F), when the shift lever 211 is in contact with the travel switch 71, the motor 215 reversely rotates and returns to the position of initial state, thus the motor 215 has two states of positive rotation and negative rotation due to the intermediate transmission mechanism in the embodiment.

Figure 14:
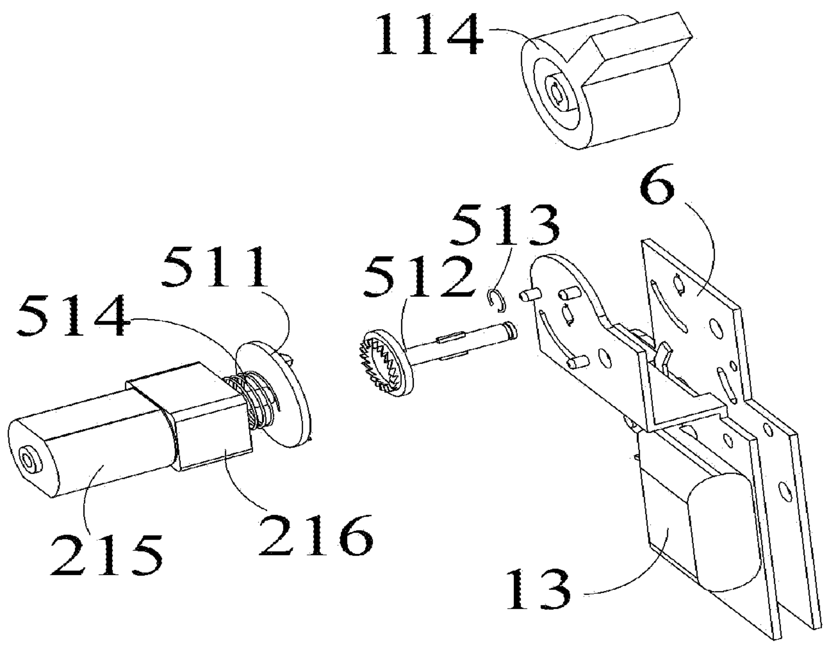
FIG. 14 is a three-dimensional exploded view of an automatic closing mechanical unit of a miniature intelligent circuit breaker in accordance with embodiment 2 of the invention.

As shown in FIG. 14 for a three-dimensional exploded view of the automatic closing mechanical unit in Embodiment 2 of the miniature intelligent circuit breaker with automatic closing function. The difference between Embodiment 2 and Embodiment 1 mainly lies in the intermediate transmission mechanism; the intermediate transmission mechanism of the automatic closing mechanical unit in Embodiment 2 comprises a driving gear disc 511 and a driven gear disc 512, wherein separate lugs distributed at an angle of 120 degrees are arranged on the working surface of the driving gear disc 511, unidirectional teeth are arranged on the working surface, the driving gear disc 511 is coupled with the motor 215, and in better situation, the motor 215 can be connected with a rotating shaft of the driving gear disc 511 through a speed reducer 216; meanwhile, a return spring 514 is arranged between the speed reducer 216 and the back side of the driving gear disc 511.

In the driven gear disc 512, unidirectional teeth corresponding to those of the driving gear disc 511 are arranged on the working surface of the driven gear disc 512, so that the driving gear disc 511 and driven gear disc 512 can transmit torque in one direction only; a key is arranged on an output shaft of the driven gear disc 512, and a groove is formed at the tail end of the output shaft.

The intermediate transmission mechanism further comprises a supporting frame provided with two opposite supporting plates; lugs corresponding to the separate lugs distributed on the working surface of the driving gear disc 511 at an angle of 120 degrees are arranged on the supporting plate opposite to the back side of the driven gear disc 512, and the lugs are higher than the unidirectional teeth; opposite shaft holes are formed on the supporting plates, the output shaft of the driven gear disc 512 penetrates the shaft hole, a shaft hole is also formed in the middle of the poke rod 114, and a key slot is formed on the shaft hole, so that the key on the output shaft of the driven gear disc 512 can be embedded in the key slot, and the torque is further transmitted; a clamp spring 513 is embedded in the groove at the tail end of the output shaft, so as to prevent the output shaft of the driven gear disc 512 from being separated from the poke rod 114.

As to the intermediate transmission mechanism adopting the structure of the driving gear disc 511 and the driven gear disc 512, the automatic closing function can be realized as long as the motor 215 rotates towards only one direction, that is, when the travel switch 71 is triggered by the poke rod 114, the motor 215 stops, and even if the miniature intelligent circuit breaker with automatic closing function is disconnected, because the unidirectional teeth are arranged between the driving gear disc 511 and the driven gear disc 512, the fact that the poke rod 114 returns to the off-position is not affected.

Figure 15A:
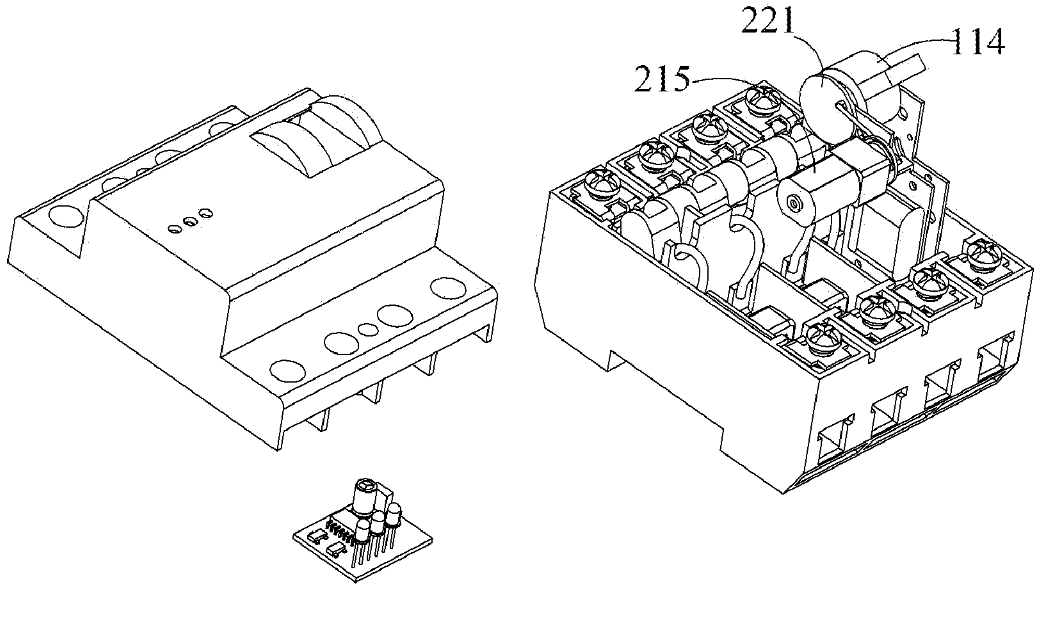
FIG. 15A is a side view of an internal structure of a miniature intelligent circuit breaker in accordance with embodiment 3 of the invention.

As shown in FIG. 15A for a side view of the internal structure of Embodiment 3 of the miniature intelligent circuit breaker with automatic closing function. The difference from Embodiment 1 above mainly lies in that the intermediate transmission mechanism of the automatic closing mechanical unit is different, and the crank-rocker mechanism is adopted here.

Figure 15B:
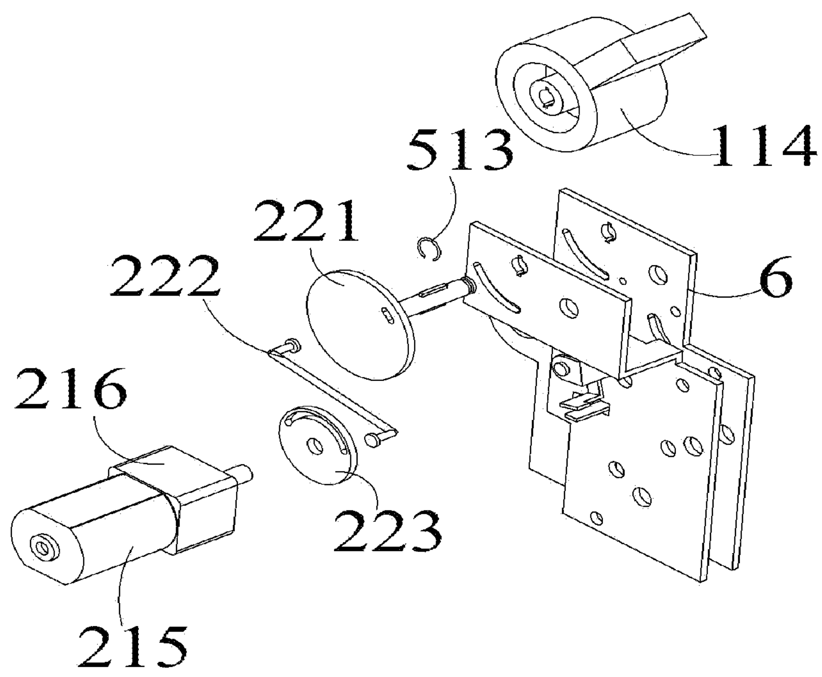
FIG. 15B is a three-dimensional exploded view of an automatic closing mechanical unit of a miniature intelligent circuit breaker in accordance with embodiment 3 of the invention.

As shown in FIG. 15B for a three-dimensional exploded view of Embodiment 3 of the automatic closing mechanical unit of the miniature intelligent circuit breaker with automatic closing function. The intermediate transmission mechanism of the automatic closing mechanical unit comprises: a driving rotating disc 223; the driving rotating disc 223 is coupled on the speed reducer 216, and an arc-shaped chute is formed on the driving rotating disc 223 and coaxial with the driving rotating disc 223.

A driven rotating disc 221; a key is arranged on an output shaft of the driven rotating disc 221, and a groove is formed at the tail end of the output shaft; and a connecting groove is formed on the driven rotating disc 221.

A Z-shaped crank 222; one end of the Z-shaped crank 222 is arranged in the arc-shaped chute of the driving rotating disc 223, and the other end of the Z-shaped crank 222 is arranged in the groove of the driven rotating disc 221.

A supporting frame 6 is also included in Embodiment 1 above and provided with two opposite supporting plates; opposite shaft holes are formed on the supporting plates, the output shaft of the driven rotating disc 221 penetrates the shaft hole, a shaft hole is also formed in the middle of the poke rod 114, and a key slot is formed on the shaft hole, so that the key on the output shaft of the driven rotating disc 221 can be embedded in the key slot, and the torque is further transmitted; a clamp spring 513 is embedded in the groove at the tail end of the output shaft, so as to prevent the output shaft of the driven rotating disc 221 from being separated from the poke rod.

Figure 15C:
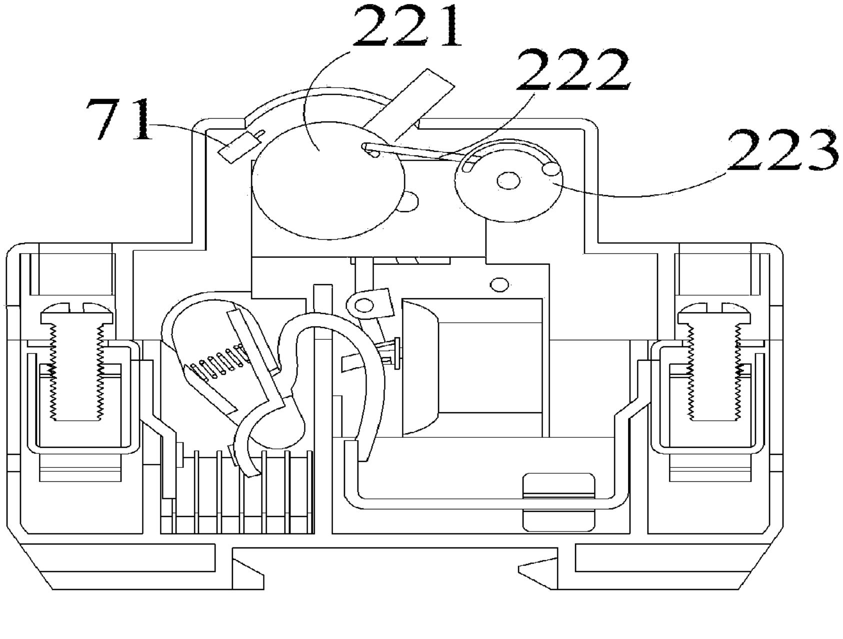
FIGS. 15C-15E are working state diagrams of an automatic closing mechanical unit of a miniature intelligent circuit breaker in accordance with embodiment 3 of the invention.
Figure 15D:
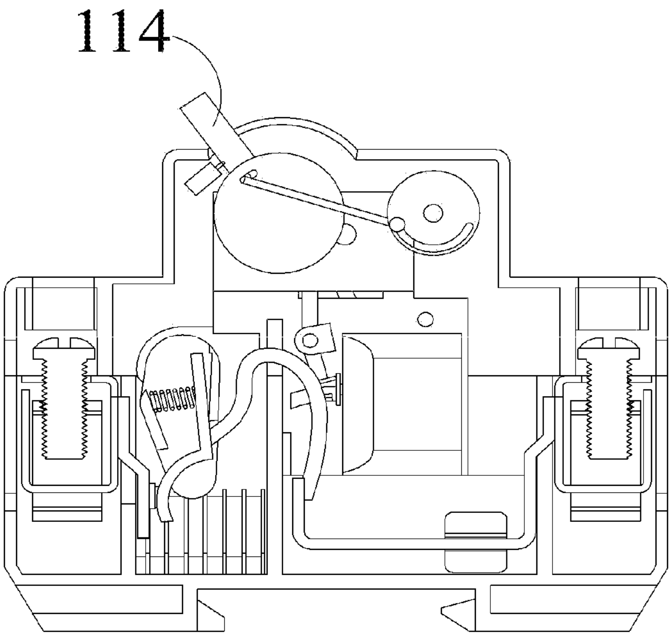
Figure 15E:
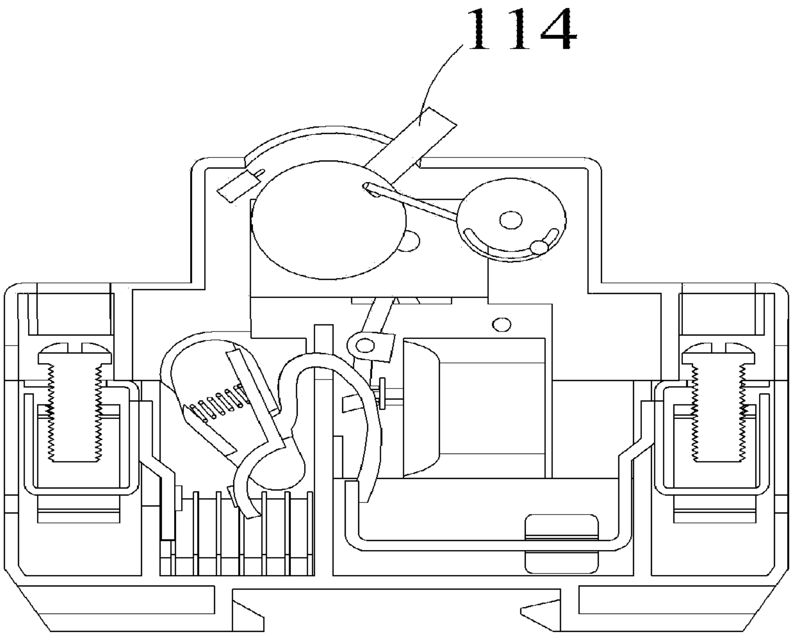

As shown in FIGS. 15C-15E for the working state diagrams of Embodiment 3 of the automatic closing mechanical unit of the miniature intelligent circuit breaker with automatic closing function. In the initial state (FIG. 15C), the miniature intelligent circuit breaker with automatic closing function is in the off state, and the motor 215 of the automatic closing mechanical unit does not receive the corresponding control signal; in the operating state (FIG. 15D), after receiving the corresponding control signal, the motor rotates to drive the driving rotating disc 223 to rotate, and the driven rotating disc 221 is driven by the crank, so that the poke rod 114 is driven to move to enable the miniature intelligent circuit breaker with automatic closing function to be closed, and when the poke rod moves to the closed position, the poke rod is in contact with the travel switch, the motor stops running; according to the mechanical principles, adjusting the radius of the driven rotating disc, the radius of the driving rotating disc as well as the arc length of the arc-shaped chute and the length of the crank is easily realized by the technicians in the field, and the circular motion of the driving rotating disc indicates that the driven rotating disc makes reciprocating motion between two corresponding limit positions (between the opened and closed positions relative to the poke rod).

Figure 15F:
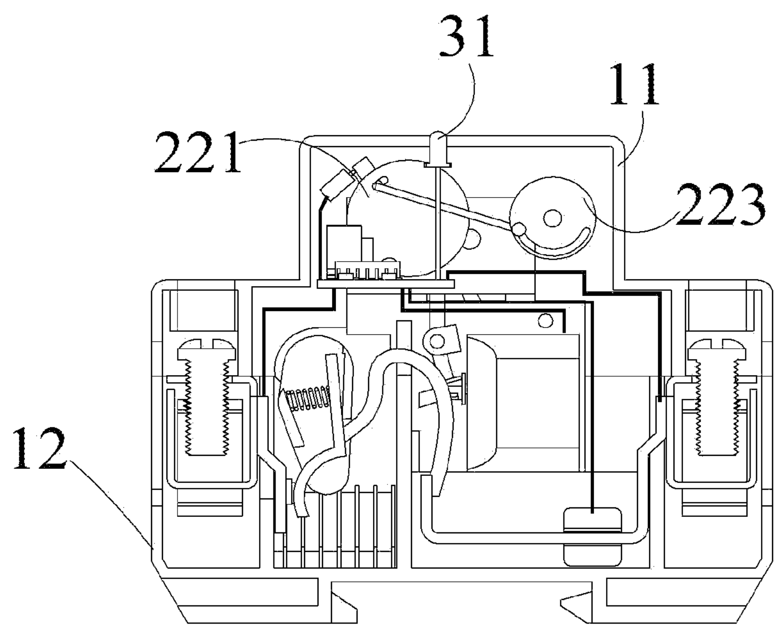
FIG. 15F is a side view of an internal structure of a closed box body of a miniature intelligent circuit breaker in accordance with embodiment 2 of the invention.

As shown in FIG. 15F for a side view of the internal structure of Embodiment 3 of the miniature intelligent circuit breaker with automatic closing function, when the box body is closed. That is, in the embodiment, the poke rod is not exposed.

Figure 16A:
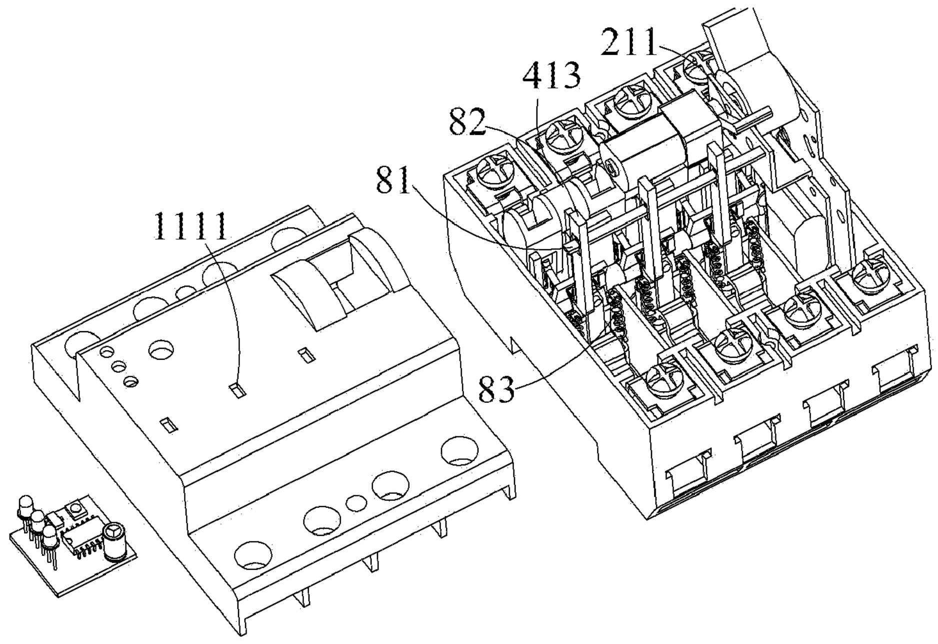
FIG. 16A is a main body exploded view of an automatic closing mechanical unit of a miniature intelligent circuit breaker in accordance with embodiment 1 of the invention, with an upper cover opened.
Figure 16B:
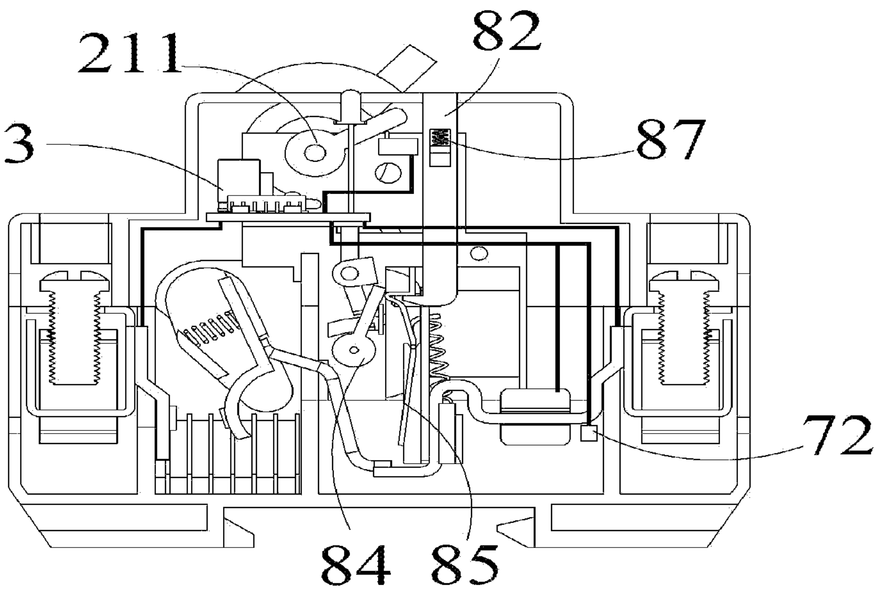
FIG. 16B is a side view of an internal structure of an automatic closing mechanical unit of a miniature intelligent circuit breaker in accordance with embodiment 1 of the invention, with mechanical short circuit self-locking function.

As shown in FIG. 16A and FIG. 16B for a main body exploded view of Embodiment 1 of the automatic closing mechanical unit of the miniature intelligent circuit breaker with automatic closing function, adding the mechanical short circuit self-locking function, with the upper cover opened, and the side view of the internal structure of Embodiment 1 of the automatic closing mechanical unit of the miniature intelligent circuit breaker with mechanical short circuit self-locking function. The mechanical short circuit self-locking function is realized through a short circuit self-locking mechanism, the short circuit self-locking mechanism has its structure on each phase line and comprises a limit rod 82, wherein a hooked part is arranged at one end of the limit rod 82 and hooked in a groove formed on an axial linkage rod of the linkage component, the axial linkage rod 413 can swing, and the other end of the limit rod 82 can extend out via a hole 1111 formed on the upper cover; a through groove is formed in the middle of the limit rod 82, a fixing part 81 is fixedly connected with the supporting frame 6 from the lower part and penetrates the through groove, and a return spring 87 is arranged in the through groove; when a short circuit occurs, a strong magnetic field is generated at the wire inlet end, a metal contact piece 85 is attracted and further rotates around the hinge shaft, a push-out end pushes a linkage block 84 to move, the connecting rod further drives the linkage rod 413 to rotate, and ultimately, the moving contact is separated from the stationary contact; at the same time, the limit rod 82 loses the limitation from the metal contact piece 85 due to the rotation of the metal contact piece 85, further moves upwards under the action of the return spring 83 and extends out from the hole 1111 on the upper cover, and the hooked part is propped against the metal contact piece 85 at the moment, so that the resetting is failed, that is, the short-circuit self-locking is formed. In that situation, the indication effect of the extending limit rod 82 shows that the off state of the present circuit breaker is caused by short-circuit, and if the circuit breaker is expected to be closed, the extending limit rod is required to be artificially pressed back for unlocking.

Figure 17A:
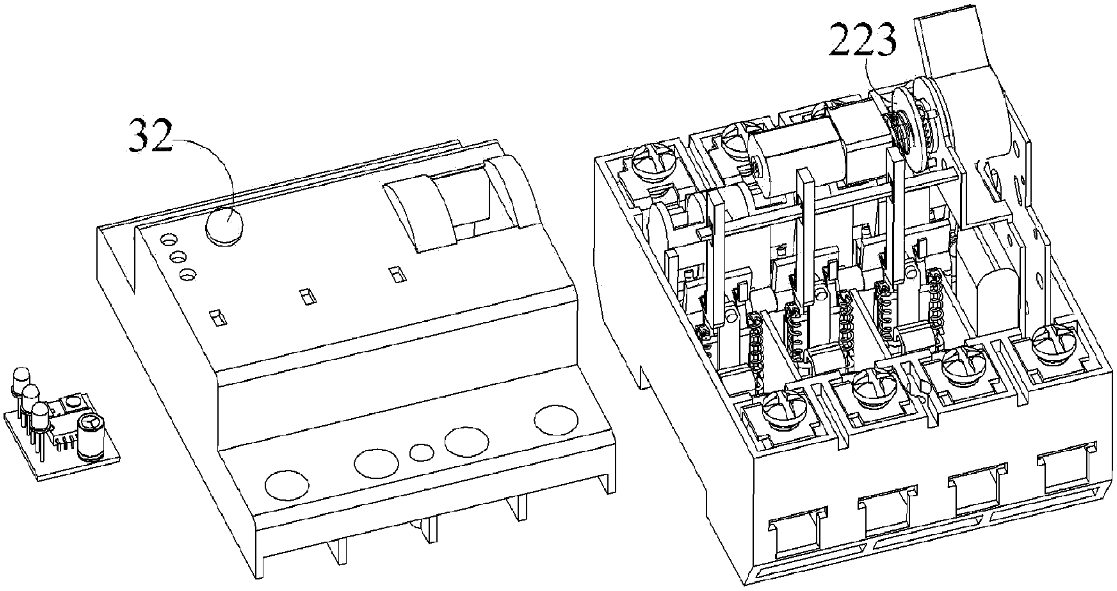
FIG. 17A is a main body exploded view of a miniature intelligent circuit breaker in accordance with embodiment 2 of the invention, with an upper cover opened.
Figure 17B:
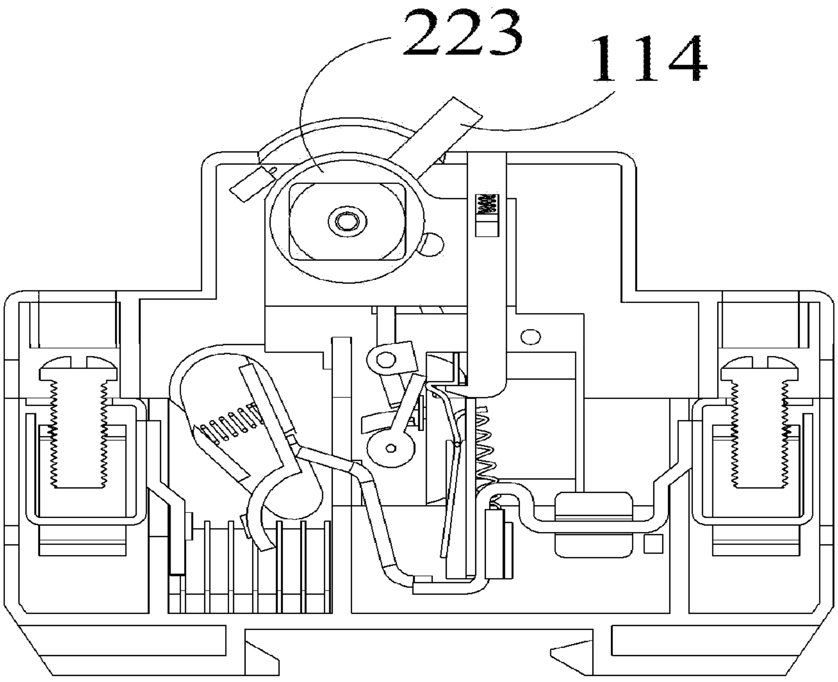
FIG. 17B is a side view of an internal structure of an automatic closing mechanical unit of a miniature intelligent circuit breaker in accordance with embodiment 2 of the invention, with mechanical short circuit self-locking function.
Figure 17C:
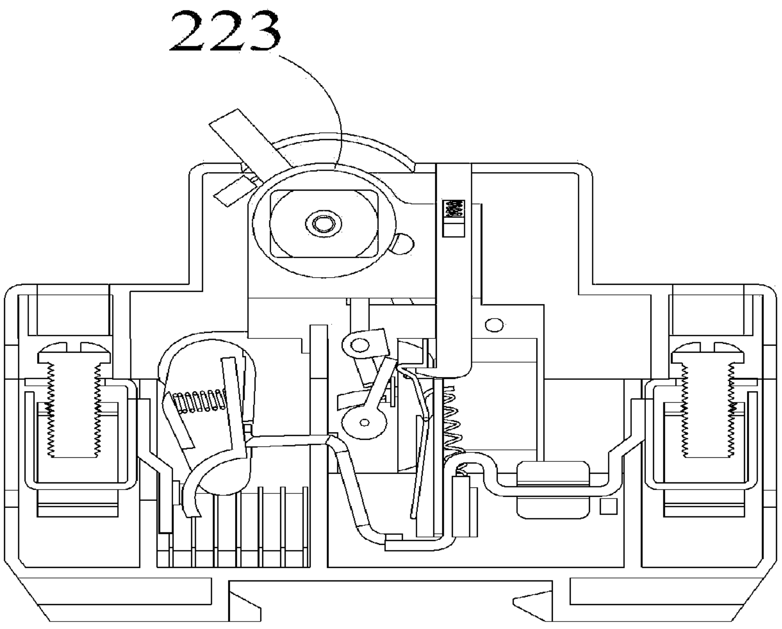
FIGS. 17C-17E are working state diagrams of an automatic closing mechanical unit of a miniature intelligent circuit breaker in accordance with embodiment 1 of the invention with mechanical short circuit self-locking function, when a short circuit occurs.
Figure 17D:
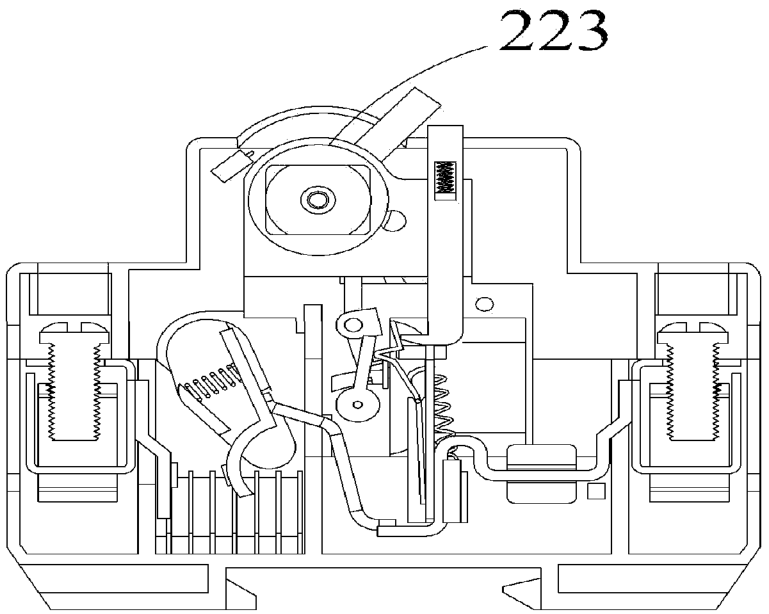

Similarly, the short circuit self-locking mechanism can also be arranged in the embodiments corresponding to other two automatic closing mechanical units above (See FIG. 17A and FIG. 17B), it is easily realized by the ordinary technicians in the field according to the description above, thus they are not required to be repeated here.

Figure 16C:
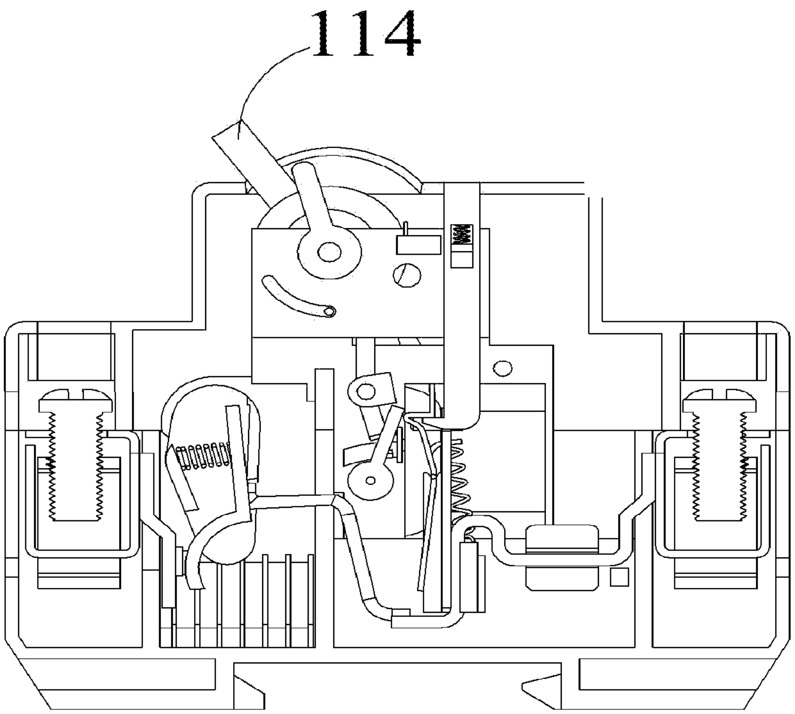
FIGS. 16C-16E are working state diagrams of an automatic closing mechanical unit of a miniature intelligent circuit breaker in accordance with embodiment 1 of the invention, when a short circuit occurs.
Figure 16D:
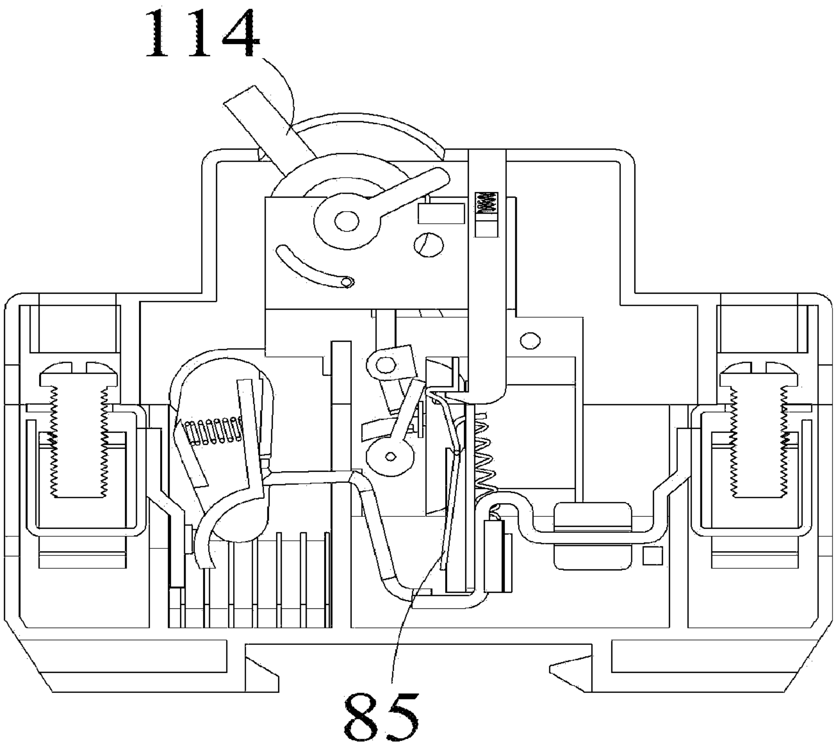
Figure 16E:
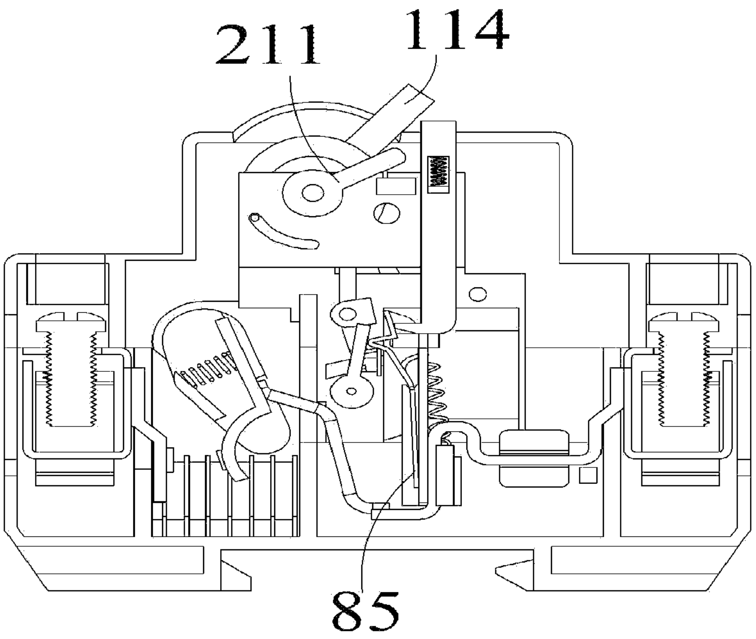

As shown in FIGS. 16C-16E for the working state diagrams of Embodiment 1 of the miniature intelligent circuit breaker with automatic closing function, adding the mechanical short circuit self-locking function, when a short circuit occurs. Simultaneously, as shown in FIGS. 6C-6E for the working state diagrams of Embodiment 2 of the miniature circuit breaker with automatic closing function, with the mechanical short circuit self-locking function added, when a short circuit occurs.

The automatic closing mechanical unit can adopt any one of the three kinds of the embodiments above, the meshing transmission between the shift lever in the embodiment of the first kind and the ratchet in the embodiment of the second kind is only taken as an example, it is easily understood by the ordinary technicians in the field according to the description above, thus they are not required to be repeated here.

Figure 16F:
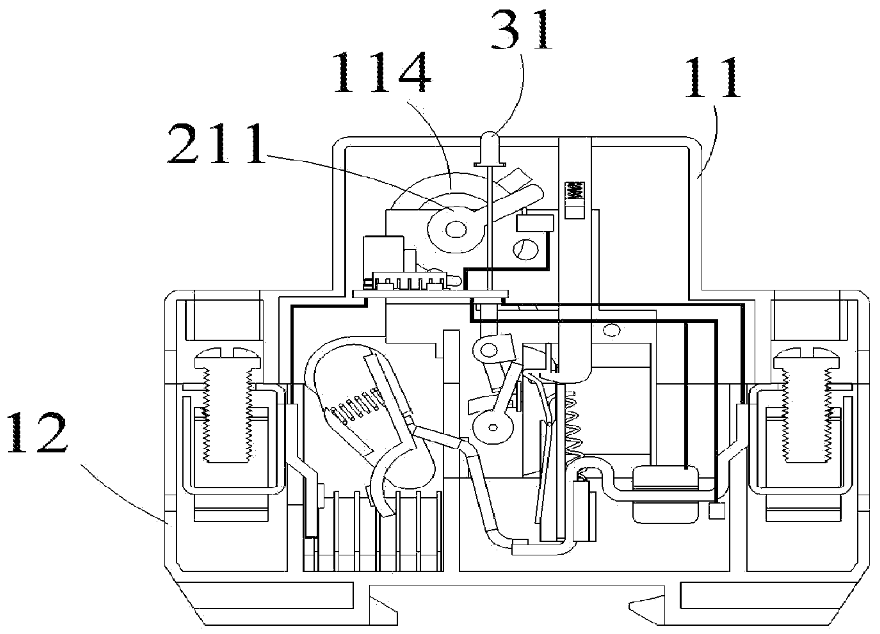
FIG. 16F is a side view of an internal structure of a closed box body of a miniature intelligent circuit breaker in accordance with embodiment 1 of the invention corresponding to the FIG. 16B.
Figure 17E:
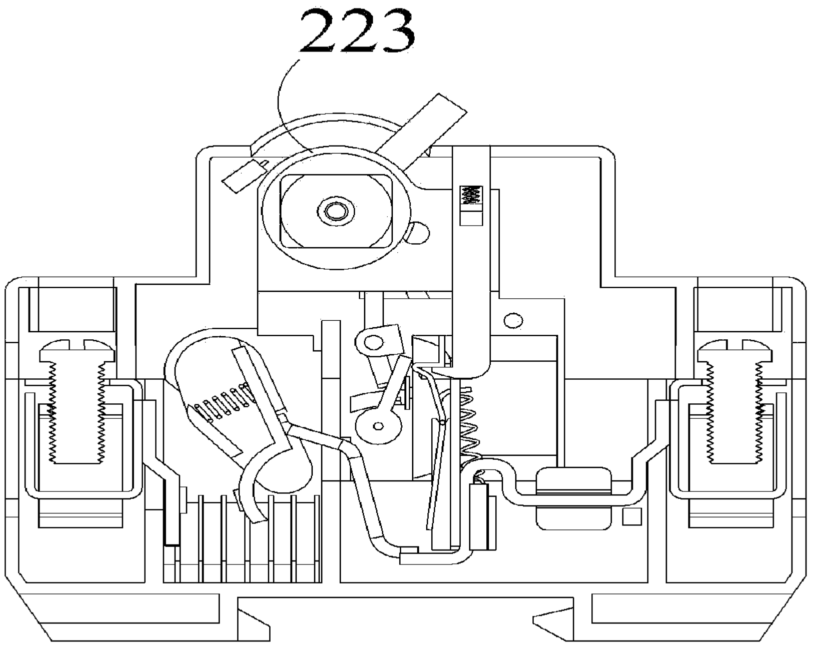
Figure 17F:
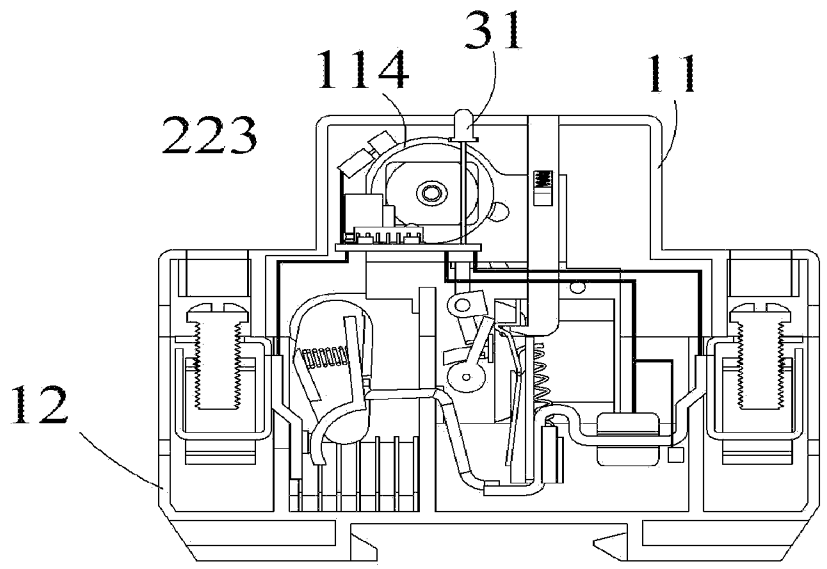
FIG. 17F is a side view of an internal structure of a closed box body of a miniature intelligent circuit breaker in accordance with embodiment 1 of the invention corresponding to the FIG. 17B.

As shown in FIG. 16F and FIG. 17E for a side views of the internal structures of the corresponding embodiments above, when the box body is closed; that is, in the two embodiments, the poke rod is not exposed. Thus an electricity consumer cannot operate the circuit breaker by himself/herself through shifting the poke rod (The poke rod can be called as a handle when exposed).

Figure 18A:
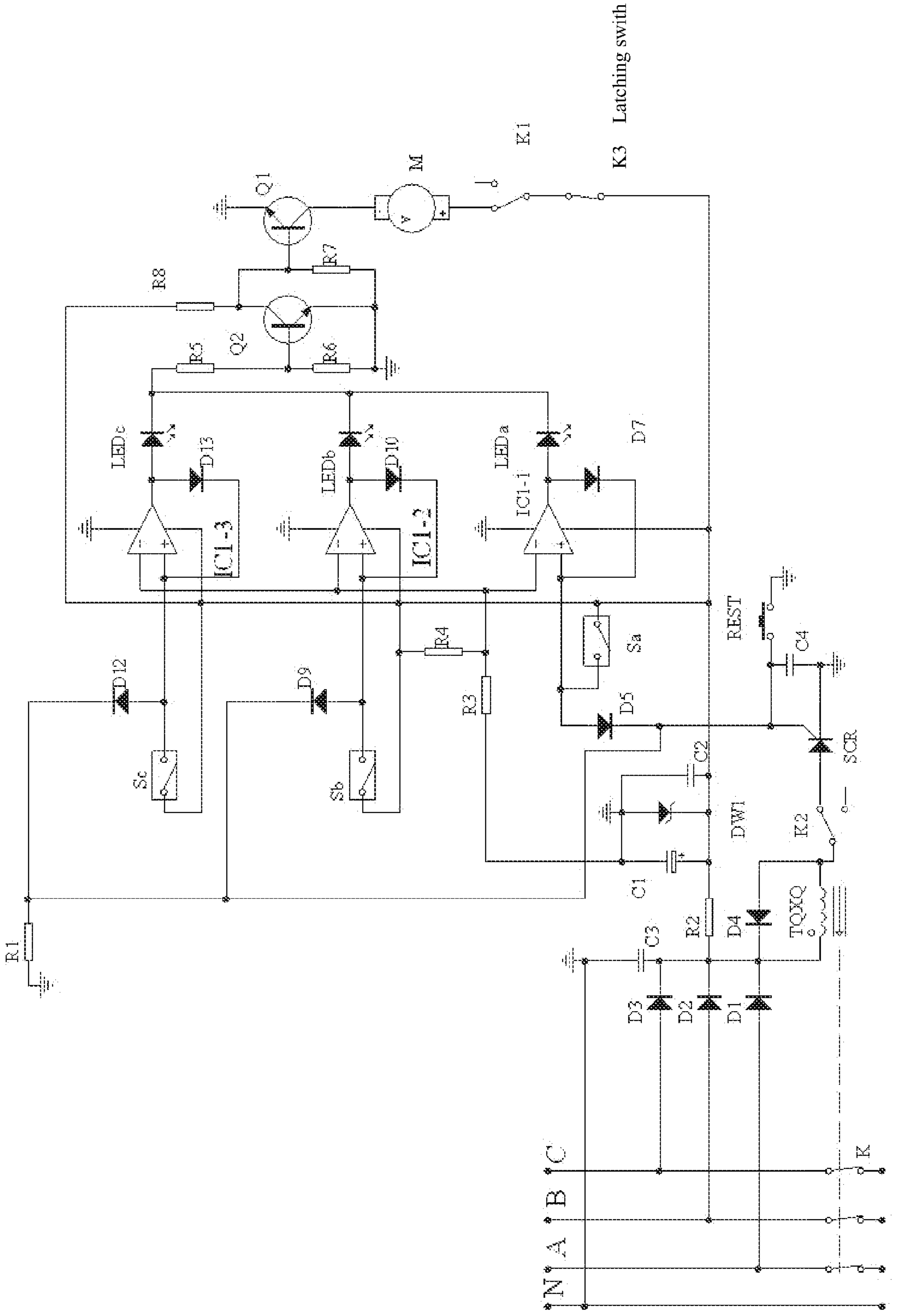
FIG. 18A is a first schematic diagram of an automatic closing control subunit of a control part circuit for a built-in intelligent circuit breaker of the invention.

As shown in FIG. 18A for a diagram 1 of the automatic closing control unit of the built-in intelligent circuit breaker with automatic closing function, it's also suitable for the miniature intelligent circuit breaker with automatic closing function, and the three-phase circuit breaker is taken as an example in the embodiment. The control circuit comprises: a power collection subunit; the power collection subunit obtains a current signal from the phase line, mainly involving the rectifying and filtering effect to the current of the phase lines, three diodes D1-D3 are adopted and connected with the phase lines A-C, and a capacitor C3 is adopted for filtering.

A voltage regulator circuit; the voltage regulator circuit comprises a voltage-stabilizing tube DW1 and a capacitor C1 and a capacitor C2 which are connected with the voltage-stabilizing tube DW1 in parallel, wherein the cathode of the capacitor C1 is grounded, and the anode of the capacitor C1 is connected with the output terminal of the power collection subunit;

A tripping subunit; when the tripping subunit receives the tripping control signal, the circuit breaker generates switch-off action; the tripping subunit comprises an electromagnet, one end of an electromagnetic coil TQXQ of the electromagnet acquires unidirectional voltage (current) from a power collection circuit, the other end of the electromagnetic coil TQXQ is grounded through a silicon controlled rectifier (SCR), and a capacitor C4 is arranged between the control end of the silicon controlled rectifier (SCR) and the ground;

A short-circuit detection circuit; the short-circuit detection circuit is used for detecting whether a short circuit occurs, and the control signal is output when a short circuit occurs; the short-circuit detection circuit comprises three groups of short-circuit detection elements and a decision element, wherein the short-circuit detection element is used for generating variation in the case of short-circuiting (The reed switches Sa, Sb and Sc are taken as an example), and the decision element (The comparators IC1-1-IC1-3 are taken as an example) is used for obtaining the variation from the short-circuit detection element and comparing the variation with the predetermined benchmark (The number of both and the number of phase lines are consistent); one ends of the reed switches Sa, Sb and Sc are connected with the noninverting terminals of the comparators IC1-1-IC1-3, and the other ends of the reed switches Sa, Sb and Sc are connected with the output terminal of the power connection subunit, so as to be used as comparison signals of the comparators IC1-1-IC1-3; the inverting terminals of the comparators IC1-1-IC1-3 obtain a stable voltage signal as the reference voltage; the embodiment is obtained by adopting a group of divider resistors R3 and R4, wherein one end of the divider resistor R3 is connected with the cathode of the capacitor C1 in the voltage regulator circuit, and the other end of the divider resistor R3 is connected with the output terminal of the power collection subunit; diodes D7, D10 and D13 are arranged between the output terminal and the noninverting terminal of each of the comparators IC1-1-IC1-3; the reed switches Sa, Sb and Sc of each short-circuit detection circuit are connected with the control end of the silicon controlled rectifier (SCR) through diodes D5, D9 and D12, so as to output the tripping control signal to the silicon controlled rectifier (SCR);

A self-locking control subunit; the self-locking control subunit receives the signal (indicating the short-circuit condition) output by a short-circuit detection subunit, so that the motor does not generate action; the self-locking control subunit comprises a first triode Q2, wherein the collecting electrode of the first triode Q2 is connected with the output terminal of the power collection subunit, the emitting electrode of the first triode Q2 is grounded, a pull-up resistor R5 obtains the output signals of the comparators IC1-1-IC1-3 and is connected with the base electrode of the first triode Q2, the base electrode is connected with the ground through a resistor R6, and a resistor R7 is connected between the emitting electrode and the collecting electrode of the first triode Q2;

An automatic closing control subunit of the motor comprises a second triode Q1, wherein the base electrode of the second triode Q1 is connected with the collecting electrode of the first triode Q2, and the emitting electrode of the second triode Q1 is grounded; one end of the motor M is connected with the output terminal of the power collection subunit, and the other end of the motor M is connected with the collecting electrode of the second triode Q1;

More preferably, to accord with the results in the mechanical structure, a limit switch K1 is arranged on a circuit for the automatic closing control subunit of the motor and used for controlling a motor M to stop running after reaching the preset position, so as to ensure the closed position of the circuit breaker;

More preferably, an inspection switch K3 (also called as a latching switch) capable of being manually opened or closed is arranged on the circuit for the automatic closing control subunit of the motor, that is, when the inspection switch K3 is in the off state, the motor M does not generate action under any state;

A tripping subunit reset circuit is also included; the tripping subunit reset circuit comprises a reset key REST, wherein the first end of the reset key REST is connected with the control end of the silicon controlled rectifier (SCR), and the second end of the reset key REST is grounded;

More preferably, light emitting diodes LEDa, LEDb and LEDc are arranged at the output terminals of the comparators IC1-1-IC1-3 and have indication effect.

Figure 18B:
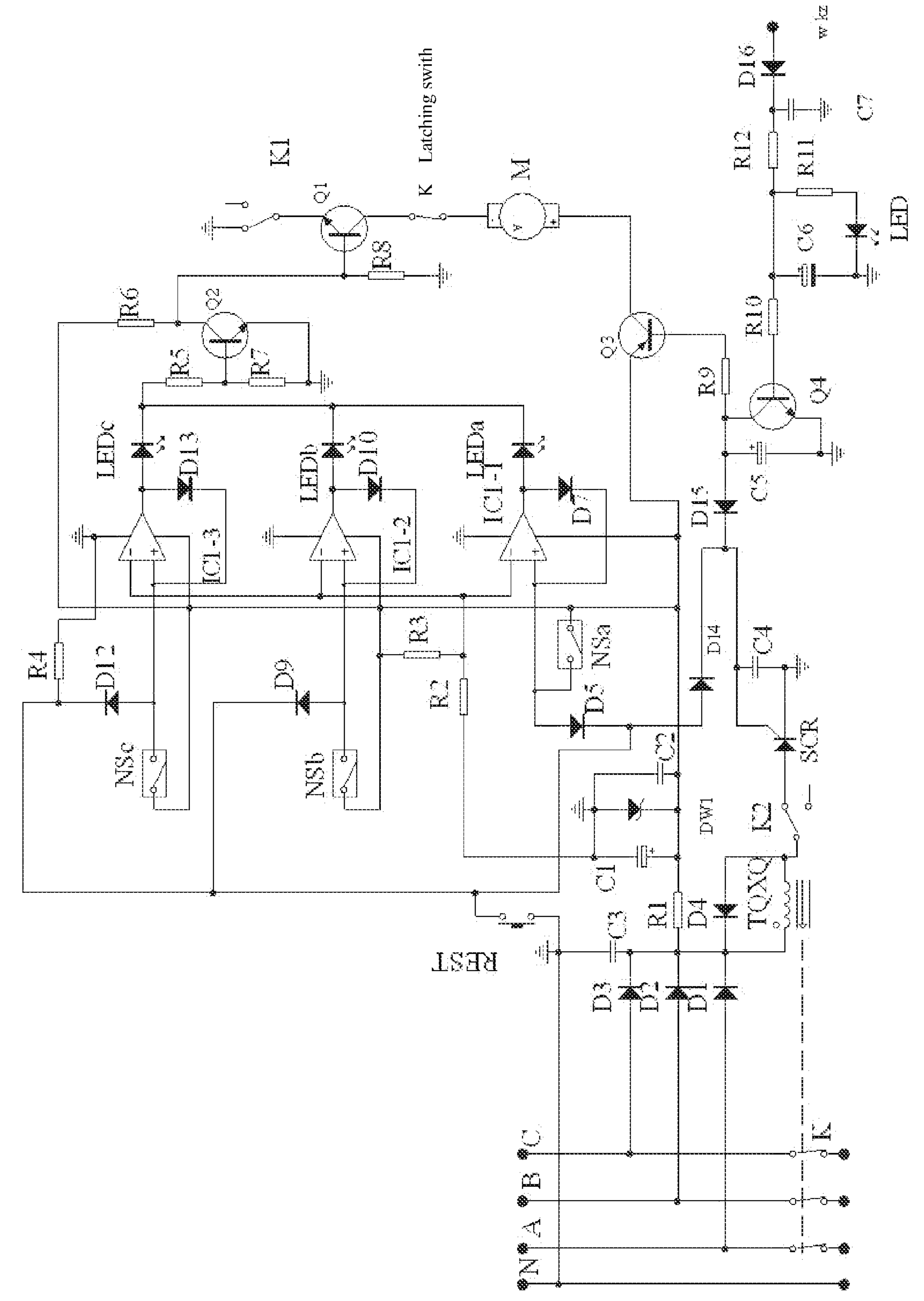
FIG. 18B is a second schematic diagram of an automatic closing control subunit of a control part circuit for a built-in intelligent circuit breaker of the invention.

As shown in FIG. 18B for a diagram 2 of the automatic closing control subunit of the built-in intelligent circuit breaker with automatic closing function, it's also suitable for the miniature intelligent circuit breaker with automatic closing function, and the difference between the diagram 2 and the diagram 1 lies in that an external control subunit is additionally arranged, so as to meet the demands of the prepayment electrical management system. The external control subunit comprises a unidirectional current component (for example, a diode D16) and a control component, wherein the control component is used for controlling both the tripping subunit and the automatic closing control subunit of the motor; the automatic closing control subunit comprises a third triode Q4 and a fourth triode Q3, wherein the base electrode of the third triode Q4 receives an external control signal, a capacitor C5 is connected between the emitting electrode and the collecting electrode of the third triode Q4, the cathode of the capacitor C5 and the emitting electrode of the third triode Q4 are grounded, and the collecting electrode of the third triode Q4 is connected with the control end of the silicon controlled rectifier (SCR) through a diode D15, that is, when the external signal is in high potential, the tripping device does not generate tripping action; the emitting electrode and the collecting electrode of the fourth triode Q3 (PNP type) are arranged on the circuit for the automatic closing control subunit of the motor M, and the base electrode of the fourth triode Q3 is connected with the collecting electrode of the third triode Q4, that is, when the external control signal is in high potential, the fourth triode Q3 is conducted;

when the external control signal is in low potential, the tripping subunit generates tripping action, and meanwhile, the fourth triode Q3 is in the cut-off state, that is, the automatic closing control subunit of the motor does not work.

More preferably, an external control indication circuit is also arranged and comprises an LED, wherein one end of the LED is grounded, the other end of the LED is connected with a resistor R11, and when the external control signal is in high voltage, the LED is in lighted state, otherwise, the LED goes out.

Figure 18C:
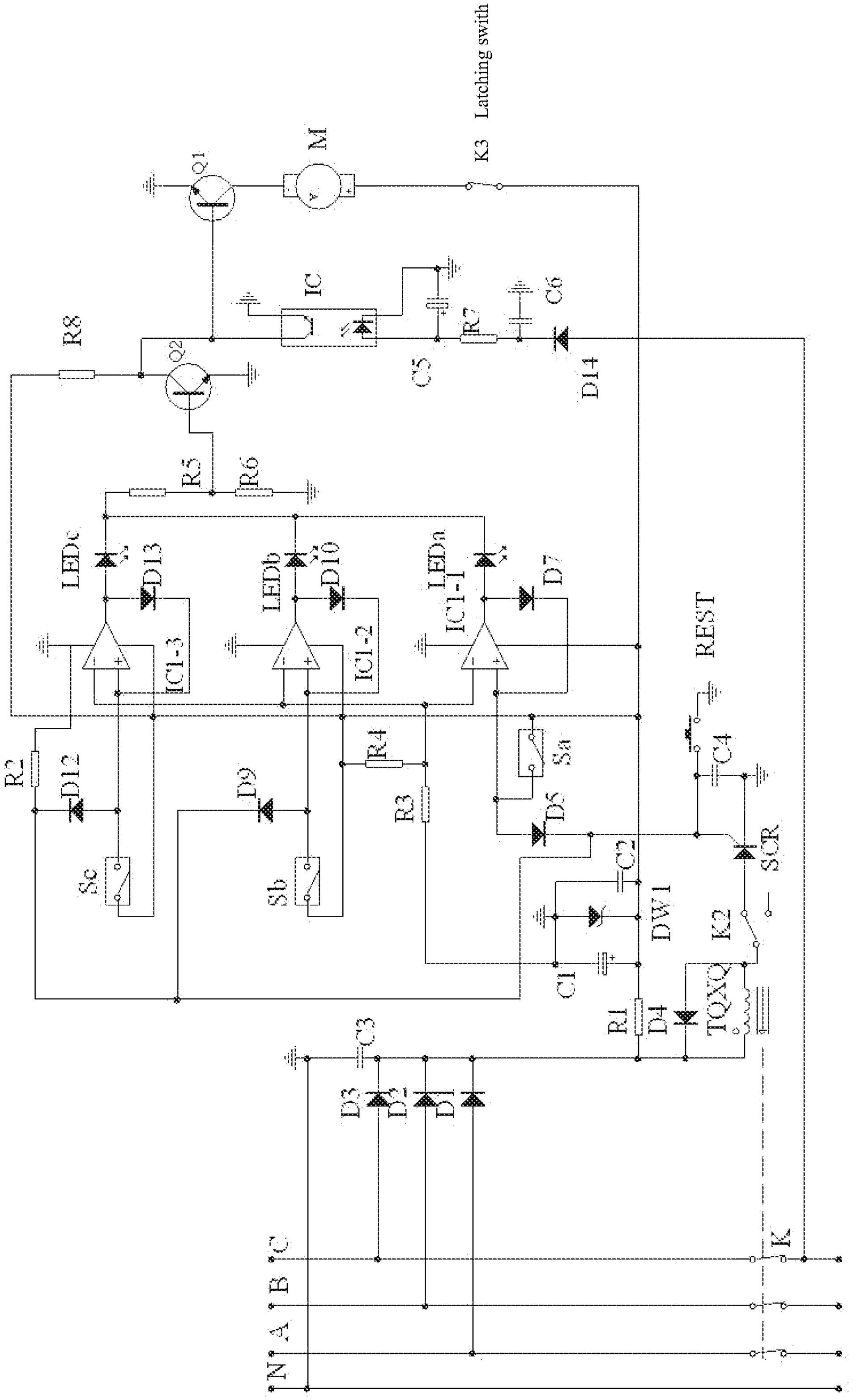
FIG. 18C is a third schematic diagram of an automatic closing control subunit of a control part circuit for a built-in intelligent circuit breaker of the invention.

As shown in FIG. 18C for a diagram 3 of the automatic closing control subunit of the built-in intelligent circuit breaker with automatic closing function, and the difference from the diagram 1 mainly lies in that a limit subunit is additionally arranged correspondingly, a limit switch is not adopted, so that the space is saved; the limit subunit comprises a photoelectric coupler IC, wherein an input terminal of the photoelectric coupler IC is connected with a phase line through a unidirectional current component (A diode D14 and a voltage dropping resistor R7 are adopted here), the other input terminal of the photoelectric coupler IC is grounded, an output terminal of the photoelectric coupler IC is grounded, and the other output terminal of the photoelectric coupler IC is connected with the base electrode of the second triode Q1; after the motor M is automatically closed, the output terminal of the photoelectric coupler IC outputs low potential, the second triode Q1 is cut-off since the base electrode obtains low potential, the automatic closing control subunit of the motor M is further disconnected, and ultimately, the motor stops running.

Figure 18D:
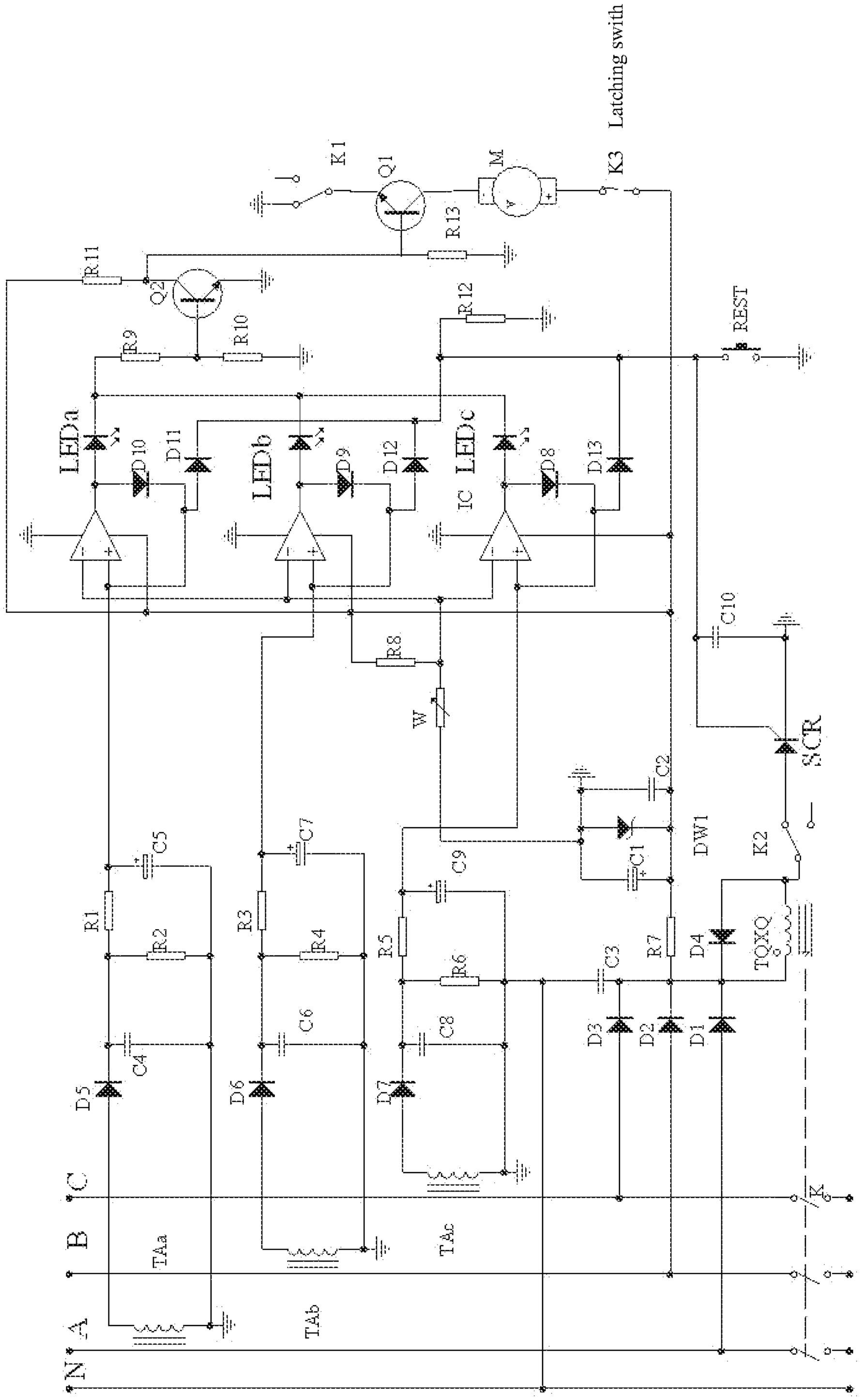
FIG. 18D is a fourth schematic diagram of an automatic closing control subunit of a control part circuit for a built-in intelligent circuit breaker of the invention.

As shown in FIG. 18D for a diagram 4 of the automatic closing control subunit of the built-in intelligent circuit breaker with automatic closing function, it's also suitable for the miniature intelligent circuit breaker with automatic closing function, and the difference between the diagram 4 and the diagram 1 mainly lies in that current is detected in the embodiment, thus the reed switches Sa, Sb and Sc are not used any more, however, the current collection component is adopted; current transformers TAa, Tab and Tac are adopted here and arranged on each phase line respectively, voltage signals are converted and transmitted to the comparators IC1-1-IC1-3, and meanwhile, the comparators IC1-1-IC1-3 transmit the output signals to both the self-locking automatic closing control subunit and the control end of the silicon controlled rectifier (SCR) for the tripping subunit; when the abnormal condition of overcurrent occurs, the comparators IC1-1-IC1-3 output high potential signals to the control end of the silicon controlled rectifier (SCR), so that the tripping action is generated, and it's necessary to explain the threshold value of an overcurrent comparator is adjustable because the reference voltage of the inverting terminals of the comparators IC1-1-IC1-3 adopts a sliding rheostat w.

Figure 18E:
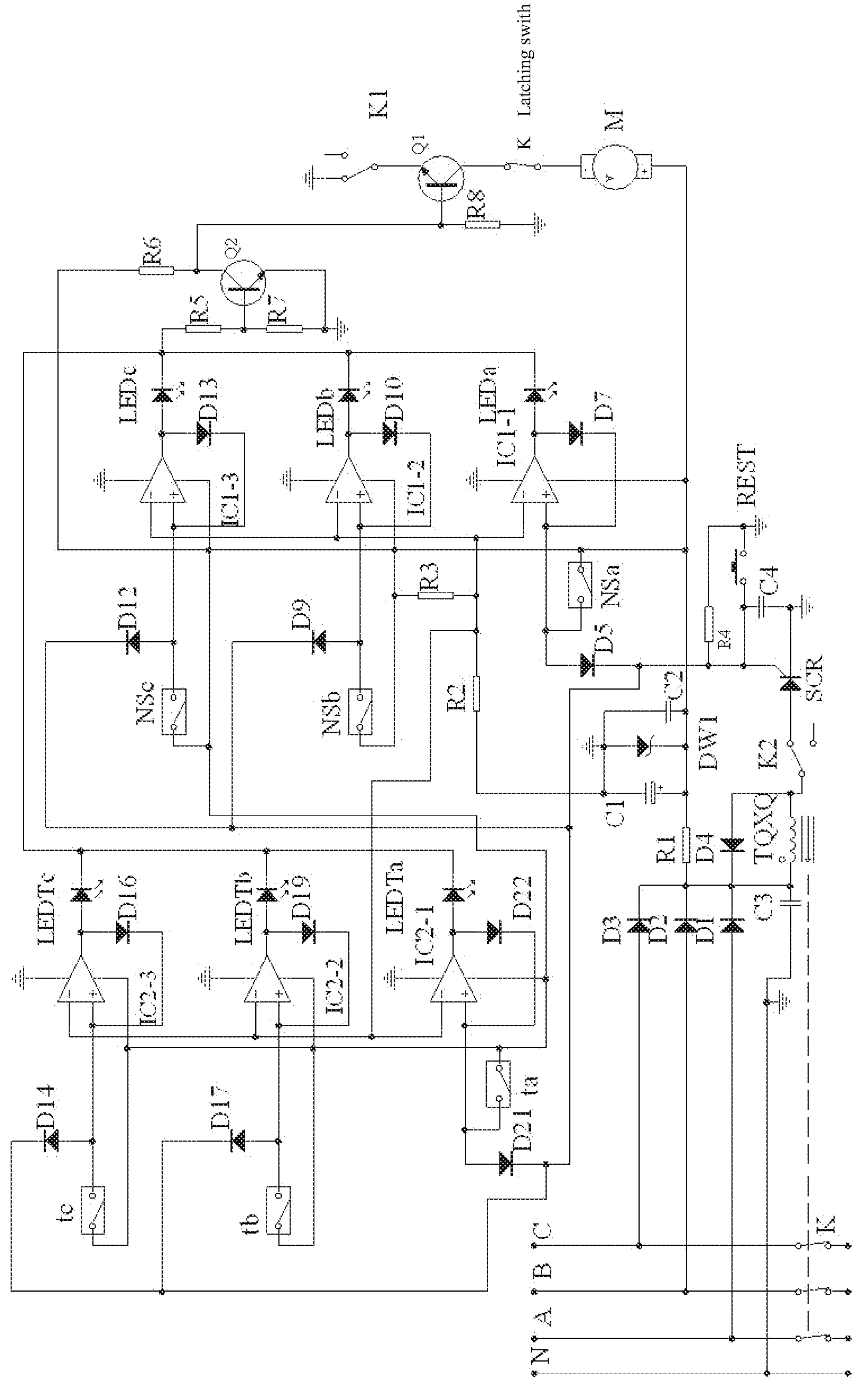
FIG. 18E is a fifth schematic diagram of an automatic closing control subunit of a control part circuit for a built-in intelligent circuit breaker of the invention.

As shown in FIG. 18E for a diagram 5 of the automatic closing control subunit of the built-in intelligent circuit breaker with automatic closing function, it's also suitable for the miniature intelligent circuit breaker with automatic closing function, and the difference from the diagram 1 mainly lies in that a temperature detection subunit is additionally arranged correspondingly, when the temperature reaches a certain threshold value, the circuit breaker is disconnected, and the self-locking function to the motor is achieved; the temperature detection subunit comprises a temperature detecting element (The temperature sensors ta, tb and tc are taken as an example here) arranged for at least one phase line, wherein the temperature detecting element is connected with a decision element (The comparators IC1-1-IC1-3 are taken as an example here), and the decision element generates at least one of a self-locking control signal and a tripping control signal according to the state of the temperature detecting element at the abnormal temperature. Three groups of temperature sensors ta, tb and tc and comparators IC2-1-IC2-3 (The number of both and the number of phase lines are consistent) are arranged for the embodiment, and one ends of the temperature sensors ta, tb and tc are connected with the noninverting terminals of the comparators IC2-1-IC2-3; the other ends of the temperature sensors ta, tb and tc are connected with the output terminal of the power collection subunit, so as to be used as comparison signals of the comparators IC2-1-IC2-3; the inverting terminals of the comparators IC2-1-IC2-3 obtain a stable voltage signal as the reference voltage; the embodiment is obtained through a group of divider resistors R2 and R3, wherein one end of the divider resistor R2 is connected with the cathode of the capacitor C1 in the voltage regulator circuit, and the other end of the divider resistor R2 is connected with the output terminal of the power collection subunit (share with the short-circuit self-locking subunit); diodes D22, D19 and D16 are arranged between the output terminal and the noninverting terminal of each of the comparators IC2-1-IC2-3; the temperature detection subunit is connected with the control end of the silicon controlled rectifier (SCR), so as to output the tripping control signal to the silicon controlled rectifier (SCR); more preferably, LEDTa-LEDTb are also arranged at the output terminals of the comparators IC2-1-IC2-3 for indication.

Figure 18F:
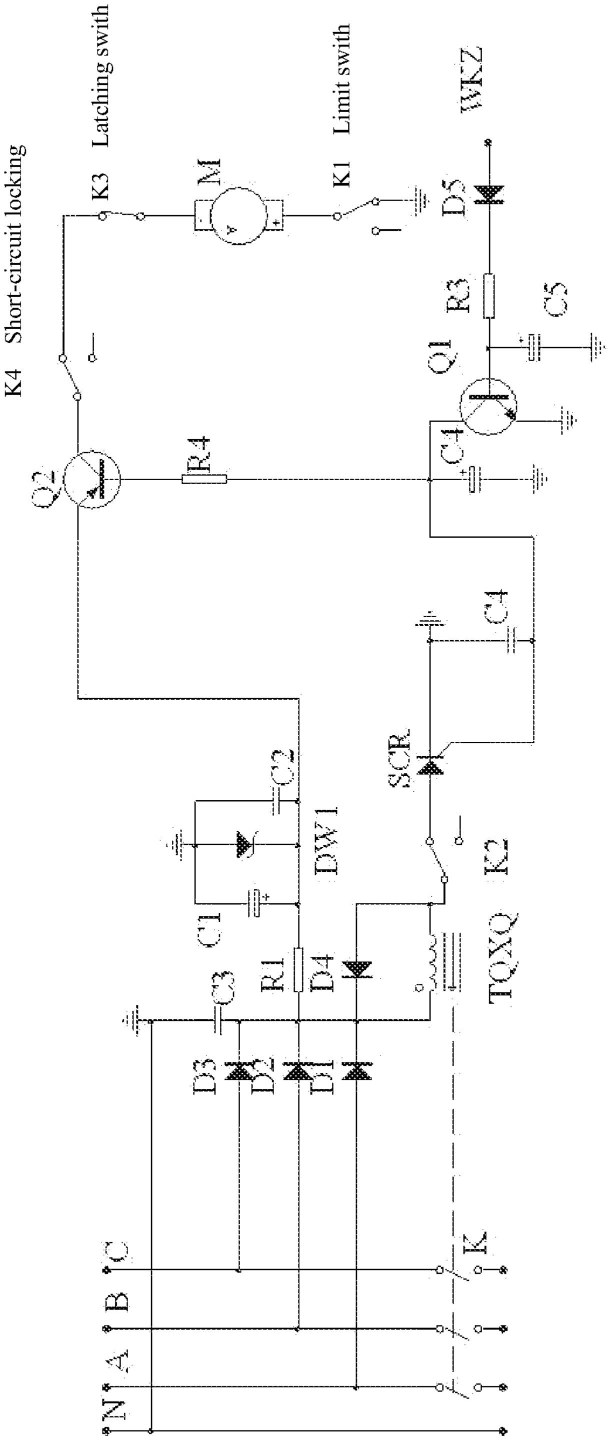
FIG. 18F is a sixth schematic diagram of an automatic closing control subunit of a control part circuit for a built-in intelligent circuit breaker of the invention.

As shown in FIG. 18F for a diagram 6 of the automatic closing control subunit of the built-in intelligent circuit breaker with automatic closing function, and it's also suitable for the miniature intelligent circuit breaker with automatic closing function; the embodiment is matched with the mechanical short-circuit self-locking method, thus the difference from the diagram 2 on the structure of the circuit mainly lies in that a short-circuit detection unit and a self-locking automatic closing control subunit are not arranged any more, however, the mechanical short-circuit method is only adopted, that is, the purpose of the invention is achieved in the form of short-circuit locking K4 on the circuit.

Figure 18G:
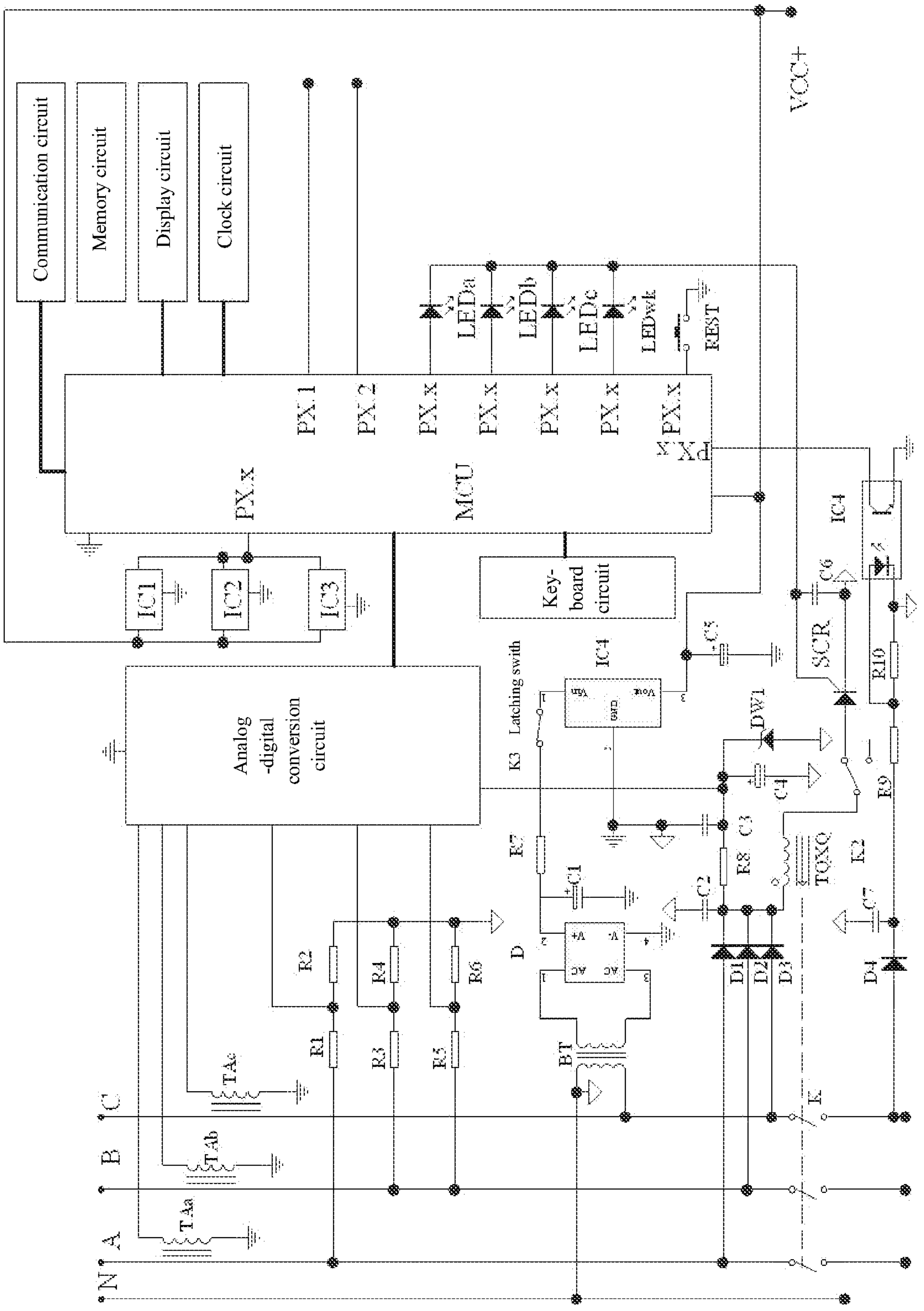
FIG. 18G is a seventh schematic diagram of an automatic closing control subunit of a control part circuit for a built-in intelligent circuit breaker of the invention.

As shown in FIG. 18G for a diagram 7 of the automatic closing control subunit of the built-in intelligent circuit breaker with automatic closing function, and it's also suitable for the miniature intelligent circuit breaker with automatic closing function; this diagram reflects an example of realizing intelligence through a processor in the prior control technology, wherein, the current value on each phase line is obtained from power lines A, B and C through the current transformers TAa, Tab and TAc, and then is converted into a corresponding digital signal through an analog-digital conversion circuit, the digital signal is transmitted to an MCU, and the program preset in the MCU can be used for determining the obtained electricity information (overcurrent/short-circuit and other abnormal conditions), so as to output the corresponding control signal; an analog power supply circuit comprises divider resistors R1-R6, and the voltage value obtained from each phase line is transmitted to the analog-digital conversion circuit; a digital power supply circuit obtains a power signal from the power line through a voltage transformer BT, and then is connected with the MCU after the processing of a voltage regulator chip D, so as to provide the power signal for the MCU, and a switch K3 is arranged between the digital power supply circuit and the MCU and used for cutting off the electricity supply of the MCU, so as to avoid an accident during the maintenance due to the unreasonable control of the MCU; a group of temperature sensors IC1-IC3 can also be included, which is used for detecting the temperature value at the node of each phase line and converting the temperature value into a digital signal transmitted to the MCU, and the MCU determines whether to output the control signal when the temperature exceeds a threshold value; a rectifier filter circuit comprises three diodes D1-D3, a capacitor C2 and a resistor R8 and supplies power to the tripping device TQXQ, a trip coil of the tripping device is grounded through the silicon controlled rectifier (SCR), and the control end of the controlled rectifier (SCR) is connected with an output terminal of the MCU; to increase the intelligent function, the MCU can also be connected with a communication circuit, can be data-interchanged with other communication devices in a wired or wireless manner, thus the control signals from the outer end can be received; a memory is used for storing various data in the circuit breaker; a display circuit is used for displaying various state information detected by the circuit breaker, and a corresponding display screen is arranged on the box body of the circuit breaker; a clock circuit and a keyboard circuit are respectively used for providing a clock signal and an input command for the MCU; there are various corresponding circuits for the functional circuits above from the specific implementation, each circuit is well-known, and the corresponding circuits can be selected by the technicians in the field as required, thus they are not required to be repeated here; the output terminals PX.1 and PX.2 of the MCU are connected with the self-locking control subunit in the embodiment above for purpose of controlling the action of the automatic closing control subunit of the motor, and can also be directly connected with the automatic closing control subunit of the motor, and the MCU determines whether the automatic closing control subunit is required to work according to whether the present abnormal electricity condition is eliminated.

Figure 18H:
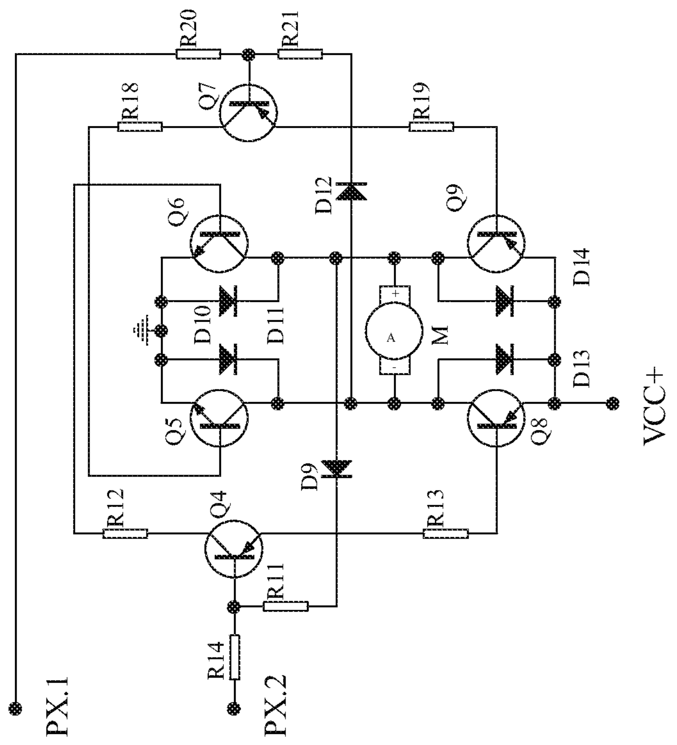
FIG. 18H is a schematic diagram of a control circuit for reciprocating motion of an automatic closing control subunit to a motor.

As shown in FIG. 18H for a diagram of the control circuit for reciprocating motion of the automatic closing control subunit of the built-in intelligent circuit breaker with automatic closing function to the motor, and it's also suitable for the miniature intelligent circuit breaker with automatic closing function; in the diagram, there are four groups of PNP triodes Q5, Q6, Q8 and Q9 and protecting diodes D10, D11, D13 and D14, wherein the collecting electrodes are connected with the anodes of the protecting diodes, the emitting electrodes are connected with the cathodes of the protecting diodes, two groups of PNP triodes Q6 and Q9 and collecting electrodes of protecting diodes D11 and D14 are connected at the noninverting terminal of the motor, and the emitting electrodes between the two groups are connected together; the other two groups of PNP triodes Q5 and Q8 and collecting electrodes of protecting diodes D10 and D13 are connected at the inverting terminal of the motor, and the emitting electrodes between the two groups are connected together; in a first unilateral diode D9, the anode is connected with the noninverting terminal of the motor, and the cathode is connected with a control terminal PX.2 of the MCU; in a second unilateral diode D12, the anode is connected with the inverting terminal of the motor, and the cathode is connected with a control terminal PX.1 of the MCU (as shown in FIG. 13G); the base electrode of the PNP triode Q9 is connected with the emitting electrode of the PNP triode Q7, and the base electrode of the PNP triode Q7 is connected with the control terminal PX.1; the base electrode of the PNP triode Q8 is connected with the emitting electrode of the PNP triode Q4, the base electrode of the PNP triode Q4 is connected with the control terminal PX.2, and the collecting electrode of the PNP triode Q4 is connected with the base electrode of the PNP triode Q6; the base electrode of the PNP triode Q5 is connected with the collecting electrode of the PNP triode Q7; meanwhile, the base electrode of the PNP triode Q6 is connected with the collecting electrode of the PNP triode Q4. The positive rotation and the negative rotation of the motor are controlled through the output signals at the control terminals PX.1 and PX.2 of the MCU, so that the reciprocating motion of the corresponding actuating mechanism is realized.

Figure 18I:
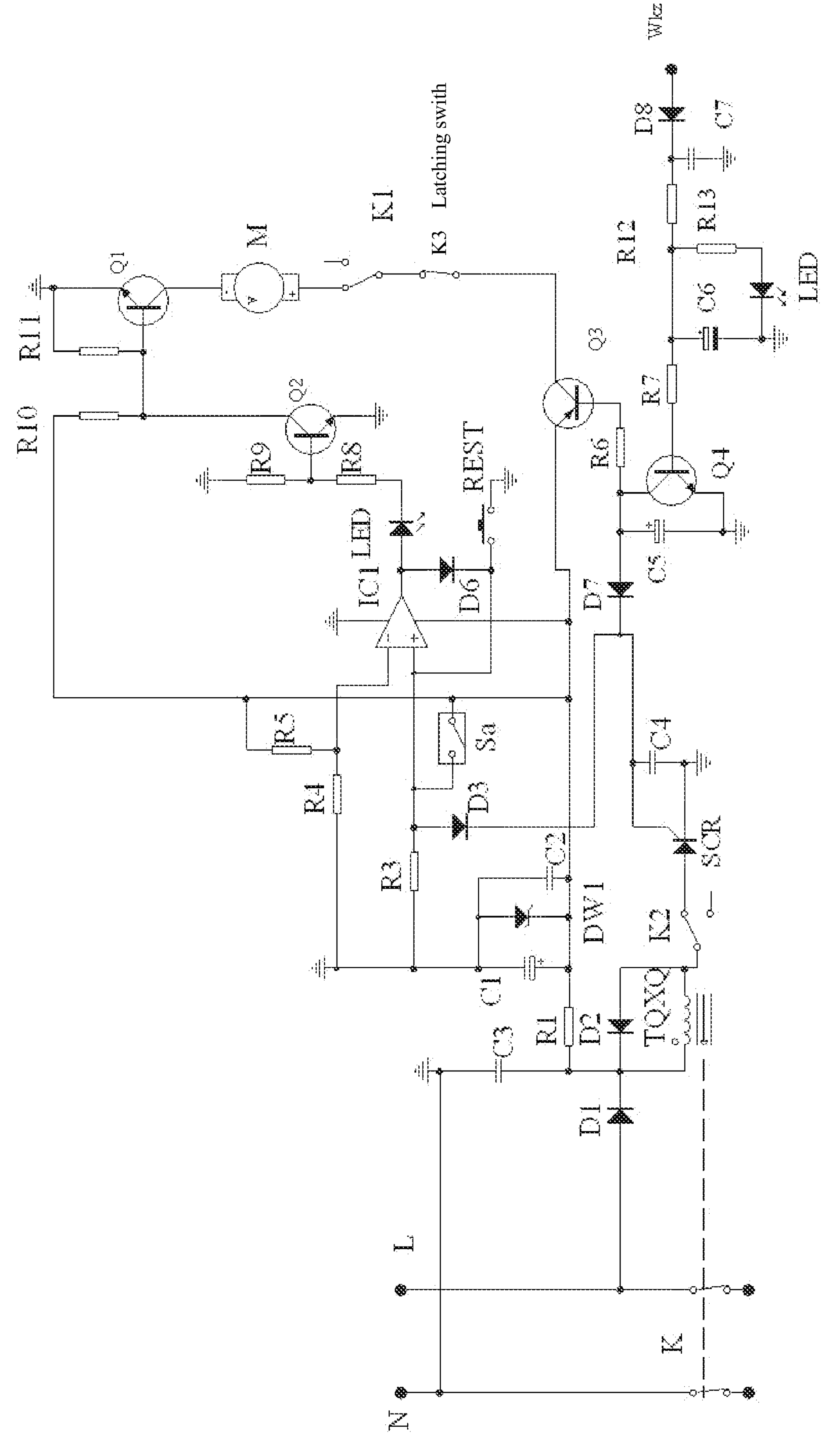
FIGS. 18I-18J are schematic diagrams of an automatic closing control unit of a miniature intelligent circuit breaker in accordance with one embodiment of the invention.

As shown in FIG. 18I for a diagram 3 of the automatic closing control subunit of the built-in intelligent circuit breaker with automatic closing function to the motor; the difference from the diagram 2 mainly lies in that the diagram is aimed at the single-phase circuit breaker, thus its circuit is only omitted, however, the principle of the circuit is exactly the same, and it can be understood by the ordinary technicians in the field obviously according to the description above, thus it's not required to be repeated here.

Figure 18J:
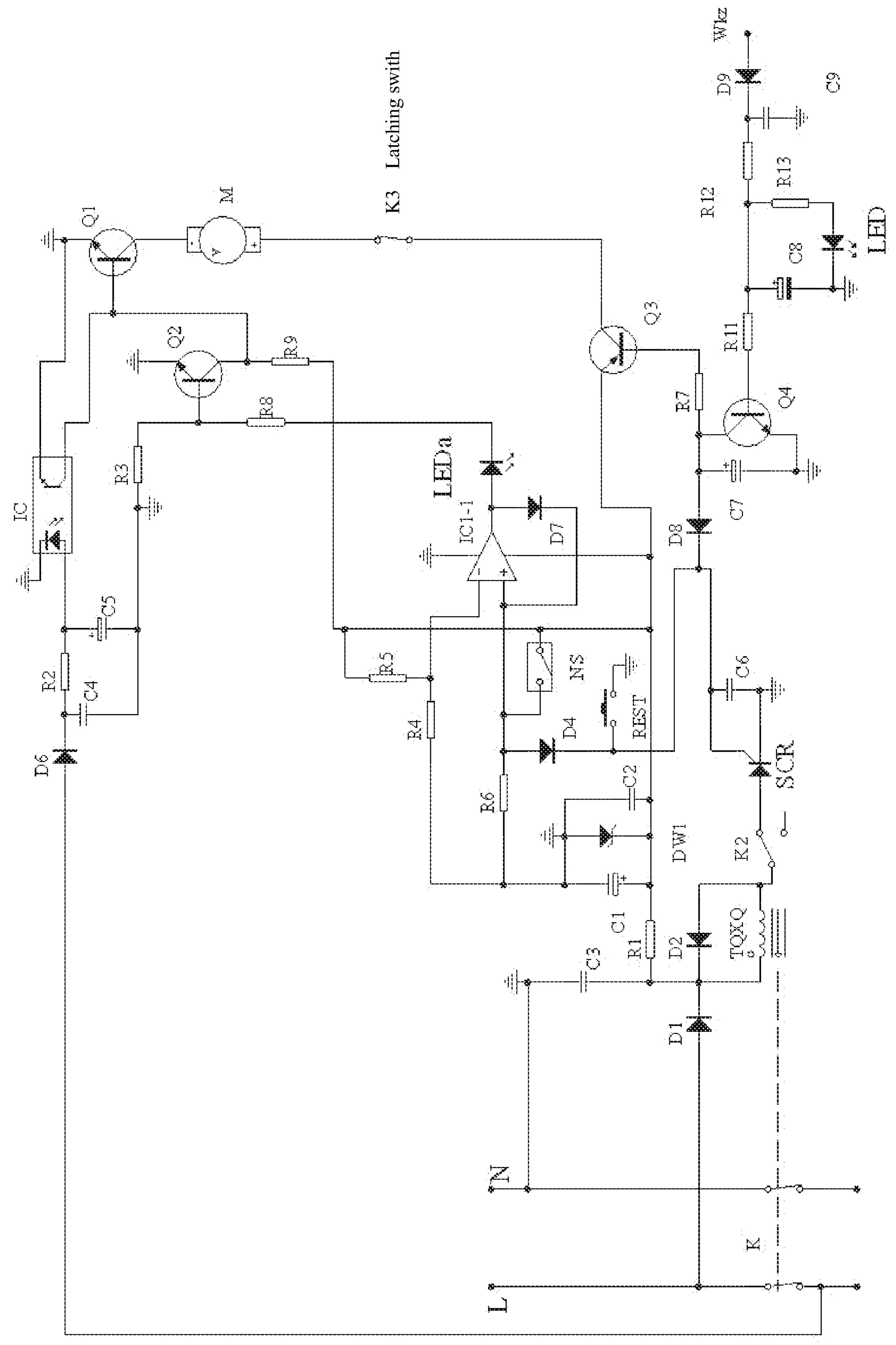

As shown in FIG. 18J for a diagram 5 of the automatic closing control subunit of the built-in intelligent circuit breaker with automatic closing function to the motor; the difference from the diagram 3 above mainly lies in that a limit subunit is additionally arranged correspondingly, a limit switch is not adopted, thus the space is saved; the limit subunit comprises a photoelectric coupler IC, wherein an input terminal of the photoelectric coupler IC is connected with the phase line through a unidirectional current component (A diode D14 and a voltage dropping resistor R7 are adopted here), the other input terminal of the photoelectric coupler IC is grounded, an output terminal of the photoelectric coupler IC is grounded, and the other output terminal of the photoelectric coupler IC is connected with the base electrode of the second triode Q1; after the motor M is automatically closed, the output terminal of the photoelectric coupler IC outputs low potential, the second triode Q1 is cut-off since the base electrode obtains low potential, the automatic closing control subunit of the motor M is further disconnected, and ultimately, the motor stops running.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A built-in intelligent circuit breaker, comprising a box body and a bearing plate, wherein
- inside the box body is provided with a circuit breaker actuating mechanism, a wire inlet end, and a wire outlet end, and the circuit breaker actuating mechanism is triggered through a poke rod positioned in the box body;
- the bearing plate is positioned in the box body and combined with an electrical operating mechanism;
- the electrical operating mechanism is provided with an execution end, and the execution end is connected with the poke rod, so that the circuit breaker actuating mechanism is triggered by the poke rod to realize the on/off of the circuit breaker during the operation of the electrical operating mechanism under the control of an automatic closing control unit;
- the electrical operating mechanism comprises: a pinion-and-rack mechanism and a shifting part;
- the shifting part is connected with the poke rod; and
- a motor is arranged in a bottom box, and the pinion-and-rack mechanism transforms the rotation of the motor into reciprocating action of the shifting part, so that the circuit breaker actuating mechanism is triggered by the poke rod to realize the on/off of the circuit breaker.

2. The built-in intelligent circuit breaker of claim 1, wherein an opening corresponding to a notch groove is formed on the bearing plate, and mutually parallel chutes are formed on two sides of the opening; and the shifting part is a frame body, the poke rod penetrates the middle of the frame body, and slide rails capable of sliding along the chutes are arranged on two sides of the frame body.

3. The built-in intelligent circuit breaker of claim 2, wherein the pinion-and-rack mechanism comprises:

a rack combined with the frame body and capable of driving the frame body to make reciprocating motion; and a first gear arranged on the bearing plate and meshed with the rack.

4. The built-in intelligent circuit breaker of claim 3, wherein the pinion-and-rack mechanism further comprises: a second gear arranged on the bearing plate and meshed with the first gear.

5. The built-in intelligent circuit breaker of claim 4, wherein at least one guide limit groove is formed on a lateral wing of the frame body.

6. The built-in intelligent circuit breaker of claim 4, wherein the pinion-and-rack mechanism further comprises: a speed reducer arranged on an output shaft of the motor.

7. A built-in intelligent circuit breaker, comprising a box body and a bearing plate, wherein inside the box body is provided with a circuit breaker actuating mechanism, a wire inlet end, and a wire outlet end, and the circuit breaker actuating mechanism is triggered through a poke rod positioned in the box body;

the bearing plate is positioned in the box body and combined with an electrical operating mechanism;

the electrical operating mechanism is provided with an execution end, and the execution end is connected with the poke rod, so that the circuit breaker actuating mechanism is triggered by the poke rod to realize the on/off of the circuit breaker during the operation of the electrical operating mechanism under the control of an automatic closing control unit;

the electrical operating mechanism comprises: a translational mechanism and a shifting part;

the shifting part is connected with the poke rod; and the translational mechanism drives the shifting part to make reciprocating motion, so that the circuit breaker actuating mechanism is triggered by the poke rod to realize the on/off of the circuit breaker.

8. The built-in intelligent circuit breaker of claim 7, wherein an opening corresponding to a notch groove is formed on the bearing plate; and the shifting part adopts a shift fork, a shift opening is formed at one end of the shift fork, the poke rod is arranged in the shift opening, and a push opening is formed at the other end of the shift fork.

9. The built-in intelligent circuit breaker of claim 8, wherein at least one guide groove parallel to the notch groove is formed on the bearing plate, and a bulge is arranged on the bottom surface of the shifting part and embedded in the guide groove.

10. The built-in intelligent circuit breaker of claim 9, wherein the translational mechanism comprises:

a motor and a guide support seat; a threaded column is arranged at an output shaft of the motor and provided with an end, and a propping part is arranged on the bottom side of the motor;

the guide support seat is arranged on the bearing plate and provided with an inner threaded opening, and the threaded column is screwed into the inner threaded opening; and the end of the threaded column and the propping part correspond to the two inner side walls of the push opening respectively.

11. The built-in intelligent circuit breaker of claim 10, wherein a groove is formed on the bearing plate, and the motor is arranged in the groove.

12. The built-in intelligent circuit breaker of claim 7, wherein the shifting part adopts a shift fork, a shift opening is formed at one end of the shift fork, the poke rod is arranged in the shift opening, connecting holes are formed on two wings of the shift fork, and the middle of the shift fork is coupled with the bearing plate.

13. The built-in intelligent circuit breaker of claim 7, wherein the translational mechanism comprises: a pair of electromagnets; the electromagnets are fixedly arranged on the bearing plate, the armature end of each electromagnet is hinged with the connecting holes, and the two electromagnets are not in the same working states.

14. A built-in intelligent circuit breaker, comprising a box body and a bearing plate, wherein inside the box body is provided with a circuit breaker actuating mechanism, a wire inlet end, and a wire outlet end, and the circuit breaker actuating mechanism is triggered through a poke rod positioned in the box body;

the bearing plate is positioned in the box body and combined with an electrical operating mechanism;

the electrical operating mechanism is provided with an execution end, and the execution end is connected with the poke rod, so that the circuit breaker actuating mechanism is triggered by the poke rod to realize the on/off of the circuit breaker during the operation of the electrical operating mechanism under the control of an automatic closing control unit;

the electrical operating mechanism comprises: a crank part and a shifting part which are arranged on the bearing plate;

the shifting part is connected with the poke rod; and a motor is arranged in a bottom box, and the crank part transforms the rotation of the motor into reciprocating motion of the shifting part, so that the circuit breaker actuating mechanism is triggered by the poke rod to realize the on/off of the circuit breaker.

15. The built-in intelligent circuit breaker of claim 14, wherein the crank part comprises a ratchet-pawl mechanism and a connecting rod.

16. The built-in intelligent circuit breaker of claim 15, wherein the crank part comprises a ratchet-pawl mechanism and a push rod.

17. The built-in intelligent circuit breaker of claim 16, wherein an opening corresponding to a notch groove is formed on the bearing plate; the shifting part adopts a shift fork, the middle of the shift fork is axially arranged on the bearing plate, a shift opening is formed at one end of the shift fork, the poke rod is arranged in the shift opening, and a push opening is formed at the other end of the shift fork.

18. The built-in intelligent circuit breaker of claim 15, wherein an opening corresponding to a notch groove is formed on the bearing plate, and mutually parallel chutes are formed on two sides of the opening; the shifting part is a frame body, the poke rod penetrates the middle of the frame body, slide rails capable of sliding along the chutes are arranged on two sides of the frame body, and a connecting hole is formed on the frame body.

19. The built-in intelligent circuit breaker of claim 16, wherein the ratchet-pawl mechanism comprises:

a housing, a core, and a rolling bearing; the housing is provided with an internal tooth, and the internal tooth adopts a ratchet;

the core is arranged in the internal tooth, at least one pawl is arranged on the outer edge of the core, an elastic element is arranged between the pawl and the core, and the pawl corresponds to the ratchet; and the rolling bearing is arranged between the housing and the core.

20. The built-in intelligent circuit breaker of claim 18, wherein the ratchet-pawl mechanism comprises:

a housing, a core, and a rolling bearing; the housing is provided with an internal tooth, the internal tooth adopts a ratchet, and the push rod is obliquely arranged on the housing;

the core is arranged in the internal tooth, at least one pawl is arranged on the outer edge of the core, an elastic element is arranged between the pawl and the core, and the pawl corresponds to the ratchet; and the rolling bearing is arranged between the housing and the core.

21. The built-in intelligent circuit breaker of claim 19, wherein the ratchet-pawl mechanism further comprises: a gear; the gear is arranged on the bearing plate, teeth are arranged on the outer edge of the housing, and the gear is meshed with the housing.

22. The built-in intelligent circuit breaker of claim 21, wherein the ratchet-pawl mechanism further comprises: a disc fixedly arranged on the housing; and a connecting hole is obliquely formed on the disc, and connected together with the connecting hole of the frame body of the shifting part through the connecting rod, so that the motor rotates to drive the crank part to rotate, and the connecting rod further pulls or pushes the shifting part to move.

23. The built-in intelligent circuit breaker of claim 22, wherein a connecting hole is obliquely formed on the housing, and the connecting hole on the housing is connected together with the connecting hole of the frame body of the shifting part through the connecting rod, so that the motor rotates to drive the crank part to rotate, and the connecting rod further pulls or pushes the shifting part to move.

24. The built-in intelligent circuit breaker of claim 21, wherein a connecting hole is obliquely formed on the gear, and the connecting hole on the gear is connected together with the connecting hole of the frame body of the shifting part through the connecting rod, so that the motor rotates to drive the crank part to rotate, and the connecting rod further pulls or pushes the shifting part to move.

25. The built-in intelligent circuit breaker of claim 19, further comprising an adapting rod; wherein one end of the adapting rod is fixedly arranged at the middle of the housing, a connecting hole is formed at the other end of the adapting rod, and the connecting rod is arranged between the connecting hole of the adapting rod and the connecting hole of the frame body.

* * * * *